US012533271B2

(12) United States Patent
Mann et al.

(10) Patent No.: US 12,533,271 B2
(45) Date of Patent: Jan. 27, 2026

(54) STRETCHER HAVING RECONFIGURABLE DECK AND MATTRESS AND MULTI-PURPOSE AIR SOURCE

(71) Applicant: HILL-ROM SERVICES, INC., Batesville, IN (US)

(72) Inventors: Nicholas Mann, Cincinnati, OH (US); David C. Newkirk, Lawrenceburg, IN (US); Todd O'Neal, Batesville, IN (US); Travis A. Pelo, Batesville, IN (US); Frank Sauser, Batesville, IN (US); Jack B. Sing, Batesville, IN (US); Neal Wiggerman, Batesville, IN (US); Robert Mark Zerhusen, Batesville, IN (US)

(73) Assignee: HILL-ROM SERVICES, INC., Batesville, IN (US)

( * ) Notice: Subject to any disclaimer, the term of this patent is extended or adjusted under 35 U.S.C. 154(b) by 83 days.

(21) Appl. No.: 18/735,448

(22) Filed: Jun. 6, 2024

(65) Prior Publication Data

US 2025/0000725 A1 Jan. 2, 2025

Related U.S. Application Data

(60) Provisional application No. 63/510,666, filed on Jun. 28, 2023.

(51) Int. Cl.
*A61G 1/04* (2006.01)
*A61G 1/013* (2006.01)
*A61G 1/017* (2006.01)
*A61G 7/05* (2006.01)

(52) U.S. Cl.
CPC ............... *A61G 1/04* (2013.01); *A61G 1/017* (2013.01); *A61G 7/0507* (2013.01); *A61G 1/013* (2013.01); *A61G 7/05* (2013.01)

(58) Field of Classification Search
CPC .......... A61G 1/04; A61G 1/017; A61G 1/013; A61G 1/00; A61G 7/05; A61G 7/0507; A47C 19/04; A47C 19/00; A47C 21/08
USPC .... 5/626, 627, 625, 425, 428, 430, 185, 181
See application file for complete search history.

(56) References Cited

U.S. PATENT DOCUMENTS

| | | | | |
|---|---|---|---|---|
| 4,409,695 | A * | 10/1983 | Johnston ................ | A61G 7/052 5/616 |
| 4,669,136 | A | 6/1987 | Waters et al. | |
| 5,054,141 | A | 10/1991 | Foster et al. | |
| 5,077,843 | A * | 1/1992 | Foster L. Dale .... | A61G 7/0509 5/503.1 |
| 5,083,332 | A * | 1/1992 | Foster ................. | A61G 7/0525 5/181 |

(Continued)

FOREIGN PATENT DOCUMENTS

| | | | |
|---|---|---|---|
| CN | 2724674 | Y | 9/2005 |
| CN | 107349067 | A | 11/2017 |

(Continued)

*Primary Examiner* — Robert G Santos
(74) *Attorney, Agent, or Firm* — Barnes & Thornburg LLP

(57) ABSTRACT

A stretcher for transporting a patient includes a frame, and a patient support surface positioned on the frame. The frame includes a center section extending along a length of the frame. At least one side panel is positioned adjacent the center section. The frame also includes at least one surgical accessory rail.

22 Claims, 13 Drawing Sheets

(56) References Cited

U.S. PATENT DOCUMENTS

| | | | | | |
|---|---|---|---|---|---|
| 5,179,744 | A * | 1/1993 | Foster | A61G 13/105 | D12/133 |
| 5,337,428 | A | 8/1994 | Krauska et al. | | |
| 5,377,370 | A * | 1/1995 | Foster | A61G 7/05 | 5/620 |
| 5,502,853 | A | 4/1996 | Singleton et al. | | |
| 5,628,078 | A * | 5/1997 | Pennington | A61G 13/10 | 5/613 |
| 5,883,615 | A | 3/1999 | Fago et al. | | |
| 6,357,065 | B1 * | 3/2002 | Adams | A61G 7/005 | 5/617 |
| 6,526,609 | B2 * | 3/2003 | Wong | A61B 6/0442 | 5/942 |
| 6,675,415 | B2 * | 1/2004 | Wong | A61G 7/012 | 5/942 |
| 7,260,860 | B2 * | 8/2007 | Chambers | A61G 7/0507 | 5/713 |
| 7,363,663 | B2 * | 4/2008 | Chambers | A61G 7/0507 | 5/722 |
| 7,406,729 | B2 * | 8/2008 | Hornbach | A61G 7/05 | 5/613 |
| 7,461,425 | B2 * | 12/2008 | Chambers | A61G 7/0507 | 5/722 |
| 7,464,425 | B2 * | 12/2008 | Chambers | A61G 7/05776 | 5/739 |
| 7,565,710 | B2 * | 7/2009 | Chambers | A61G 7/0514 | 5/713 |
| 7,676,862 | B2 * | 3/2010 | Poulos | A61G 7/0509 | 5/430 |
| 7,703,158 | B2 | 4/2010 | Wilker, Jr. et al. | | |
| 7,730,562 | B2 * | 6/2010 | Hornbach | A61G 7/05 | |
| 7,743,441 | B2 * | 6/2010 | Poulos | A61G 7/005 | 5/613 |
| 7,788,747 | B2 | 9/2010 | Hakamiun et al. | | |
| 7,805,782 | B2 * | 10/2010 | Hakamiun | A61G 7/0507 | 5/430 |
| 7,845,032 | B2 * | 12/2010 | Chambers | A61G 7/05776 | 5/616 |
| 7,971,291 | B2 | 7/2011 | Stryker et al. | | |
| 8,069,514 | B2 | 12/2011 | Poulos et al. | | |
| 8,104,122 | B2 * | 1/2012 | Richards | A61G 7/0507 | 5/613 |
| 8,286,282 | B2 | 10/2012 | Smith et al. | | |
| 8,997,282 | B2 * | 4/2015 | Bossingham | A61G 7/0507 | 5/616 |
| 9,095,221 | B1 * | 8/2015 | Tiffany | A47C 17/04 | |
| 9,101,224 | B2 | 8/2015 | Chiang et al. | | |
| 9,173,796 | B2 * | 11/2015 | Rigsby | A61G 7/05 | |
| 9,504,620 | B2 | 11/2016 | Soltani et al. | | |
| 9,622,927 | B1 * | 4/2017 | Edgerton | A61G 7/002 | |
| 9,757,293 | B2 * | 9/2017 | Turner | A61G 7/002 | |
| 9,763,840 | B2 * | 9/2017 | Rigsby | A61G 7/0513 | |
| 9,925,102 | B2 * | 3/2018 | Turner | A61G 7/05792 | |
| 10,045,631 | B2 * | 8/2018 | Tiffany | A47C 7/506 | |
| 10,080,554 | B2 | 9/2018 | Hamel et al. | | |
| 10,357,414 | B2 * | 7/2019 | Bossingham | A61G 7/002 | |
| 10,463,554 | B2 * | 11/2019 | O'Reagan | A61G 7/002 | |
| 10,603,233 | B2 * | 3/2020 | Rigsby | A61G 7/0513 | |
| 10,639,222 | B2 | 5/2020 | Filatov et al. | | |
| 10,799,407 | B2 * | 10/2020 | Christie | A61G 7/015 | |
| 10,842,288 | B2 | 11/2020 | Bedel et al. | | |
| 10,849,804 | B2 * | 12/2020 | Lacasse | A61G 7/015 | |
| 11,020,295 | B2 | 6/2021 | Schaaf et al. | | |
| 11,259,975 | B2 * | 3/2022 | O'Leary | A61G 7/0514 | |
| 11,376,177 | B2 * | 7/2022 | Rigsby | A61G 7/0513 | |
| 11,413,202 | B2 | 8/2022 | Lafleche et al. | | |
| 11,484,449 | B2 | 11/2022 | Tumavich et al. | | |
| 11,484,452 | B2 | 11/2022 | Childs et al. | | |
| 11,642,260 | B2 * | 5/2023 | Thodupunuri | A61G 7/018 | 5/613 |
| 12,186,247 | B2 * | 1/2025 | Lacasse | A61G 7/018 | |
| 2002/0138904 | A1 * | 10/2002 | Wong | A61G 7/012 | 5/713 |
| 2003/0101513 | A1 * | 6/2003 | Wong | A61G 7/0513 | 5/601 |
| 2006/0021142 | A1 * | 2/2006 | Hornbach | A61G 7/0509 | 5/613 |
| 2006/0026767 | A1 * | 2/2006 | Chambers | A61G 7/0514 | 5/713 |
| 2006/0026768 | A1 * | 2/2006 | Chambers | A61G 7/05776 | 5/713 |
| 2006/0059621 | A1 * | 3/2006 | Poulos | A61G 7/012 | 5/430 |
| 2006/0059624 | A1 * | 3/2006 | Poulos | A61G 7/002 | 5/618 |
| 2006/0195984 | A1 * | 9/2006 | HakamiuN | A61G 7/0514 | 5/430 |
| 2007/0136949 | A1 * | 6/2007 | Richards | A61G 7/0507 | 5/624 |
| 2008/0005847 | A1 * | 1/2008 | Chambers | A61G 7/0514 | 5/713 |
| 2008/0005848 | A1 * | 1/2008 | Chambers | A61G 7/05776 | 5/713 |
| 2008/0010752 | A1 * | 1/2008 | Chambers | A61G 7/05776 | 5/713 |
| 2008/0282472 | A1 * | 11/2008 | Hornbach | A61G 7/05 | 5/616 |
| 2009/0070942 | A1 * | 3/2009 | Chambers | A61G 7/05776 | 5/713 |
| 2010/0257672 | A1 * | 10/2010 | Poulos | A61G 7/002 | 5/618 |
| 2010/0306919 | A1 | 12/2010 | Suzuki et al. | | |
| 2011/0011708 | A1 | 1/2011 | Ellafrits | | |
| 2012/0198627 | A1 | 8/2012 | Turner et al. | | |
| 2012/0284928 | A1 * | 11/2012 | Henderson | A47C 27/053 | 5/717 |
| 2013/0298331 | A1 * | 11/2013 | Bossingham | A61G 7/018 | 5/613 |
| 2014/0026325 | A1 | 1/2014 | Guthrie | | |
| 2014/0047641 | A1 * | 2/2014 | Thodupunuri | A61G 7/0514 | 5/613 |
| 2014/0215717 | A1 * | 8/2014 | Rigsby | A61G 7/0513 | 5/613 |
| 2015/0128347 | A1 * | 5/2015 | Hutchison | A61G 7/018 | 5/616 |
| 2015/0305513 | A1 * | 10/2015 | Tiffany | A47C 7/5062 | 5/655.9 |
| 2016/0038360 | A1 * | 2/2016 | Rigsby | A61G 7/015 | 5/613 |
| 2017/0252243 | A1 * | 9/2017 | Turner | A61G 7/002 | |
| 2017/0319413 | A1 * | 11/2017 | O'Reagan | A61G 7/05776 | |
| 2017/0340497 | A1 * | 11/2017 | Rigsby | A61G 7/018 | |
| 2018/0147101 | A1 * | 5/2018 | Bossingham | A61G 7/05792 | |
| 2018/0214326 | A1 * | 8/2018 | Lacasse | A61G 7/002 | |
| 2019/0262201 | A1 | 8/2019 | Smith et al. | | |
| 2019/0290516 | A1 * | 9/2019 | Christie | A61G 7/0524 | |
| 2020/0100963 | A1 * | 4/2020 | O'Leary | A61G 13/129 | |
| 2020/0188203 | A1 * | 6/2020 | Rigsby | A61G 7/0513 | |
| 2021/0069040 | A1 * | 3/2021 | Lacasse | A61G 7/015 | |
| 2025/0000725 | A1 * | 1/2025 | Mann | A61G 1/017 | |

FOREIGN PATENT DOCUMENTS

| | | | |
|---|---|---|---|
| CN | 111481371 | A | 8/2020 |
| CN | 109620575 | B | 1/2021 |
| EP | 3181108 | B1 | 5/2020 |
| KR | 1020170100301 | A | 9/2017 |
| KR | 1020220070688 | A | 5/2022 |
| WO | 2021242949 | A1 | 12/2021 |
| WO | 2022072464 | A1 | 4/2022 |
| WO | 2021231407 | A9 | 5/2022 |

* cited by examiner

STRETCHER HAVING RECONFIGURABLE DECK AND MATTRESS AND MULTI-PURPOSE AIR SOURCE

CROSS-REFERENCE TO RELATED APPLICATIONS

This application claims priority under 35 U.S.C. § 119(e) to U.S. Provisional Application No. 63/510,666, filed Jun. 28, 2023, which is expressly incorporated by reference herein.

BACKGROUND

The embodiments described herein are related to a stretcher for transporting a patient, and more particularly, to a stretcher having a reconfigurable patient support surface and multi-purpose blower.

Generally, healthcare facilities use stretchers to transport patients throughout the facility. When a patient is transported to particular areas of the healthcare facility, for example the operating room, the patient is typically transferred to an operating table. An operating table typically has a width that is less than a width of a stretcher. The width off the operating table is configured to allow as much access for the doctor to the patient as possible. A need remains for a stretcher that is reconfigurable for use throughout the entire healthcare facility. Another need remains for implementing multiple uses of a blower positioned in or on the stretcher.

A stretcher is used across hospital units and for many clinical objectives. Traditionally, stretchers have been used primarily for temporary supporting and transporting a patient throughout a healthcare facility and occupied by the patient for relatively short periods of time. Stretchers have evolved to be used for supporting patients for longer periods of time as the patient waits for admission or treatment, transporting patients throughout a healthcare facility, and supporting patients during procedures. Traditionally, stretchers have had simple mattresses, also called a support surfaces, which are generally not powered and do not provide active therapy for patients. Traditional hospital beds have evolved to having powered surfaces, which are often equipped with air sources such as blowers or compressors that serve a specific purpose such as removing moisture from the interface between the patient and the support surface, inflating and deflating support bladders, or providing a turn function to turn a patient on the support surface. As patients spend more extended periods of time on a stretcher, as opposed to a typical hospital bed, the patients are subject to additional risks that they will develop bed sores, also known as pressure ulcers. This risk has not normally be considered significant in the traditional stretcher use case, but as stretchers are used for more extended periods of time, these risks have increased.

As healthcare delivery has evolved to provide additional care in an ambulatory, rather than inpatient approach, stretchers have also evolved to provide support to patients during lower acuity medical procedures. When stretchers are used to support patients during lower acuity surgical procedures, surgical smoke can be generated as a result of the procedures. Surgical smoke can irritate the respiratory tract and has a high concentration of carcinogens. Despite this harm, surgeons struggle to protect themselves from surgical smoke.

This migration of the traditional stretcher from being used primarily for intra-facility transportation to a patient support apparatus that may be used for patient care and longer term patient support creates challenges that require the stretcher to perform some functions of a traditional hospital bed or surgical table, while still providing ease of mobility throughout the facility. This creates the challenges of having systems that provide some of the functionality of hospital beds or surgical tables while maintaining the mobility and adaptability to several different use cases.

SUMMARY

The present disclosure includes one or more of the features recited in the appended claims and/or the following features which, alone or in any combination, may comprise patentable subject matter.

According to a first aspect of the disclosed embodiments, a stretcher for transporting a patient includes a frame and a patient support surface positioned on the frame. The frame includes a center section extending along a length of the frame. At least one side panel is positioned adjacent the center section. At least one surgical accessory rail is provided. The at least one side panel is moveable relative to the center section to expose the surgical accessory rail.

In some embodiments of the first aspect, the at least one side panel can include a right side panel and a left side panel. The right side panel can move independently of the left side panel. The at least one side panel can rotate relative to the center section to expose the surgical accessory rail. The at least one side panel can be slid inward to expose the surgical accessory rail. The at least one side panel can include a head panel positioned in a head section of the frame. A thigh panel can be positioned in a thigh section of the frame. The head panel can move independently of the thigh panel.

Optionally, in the first aspect, the patient support surface can include at least one bolster and a center section. The at least one bolster can be moveable relative to the center section when the at least one side panel is moved. The at least one bolster can include a head bolster positioned on the head panel. A thigh bolster can be positioned on the thigh panel. The head bolster can move independently from the thigh bolster.

It may be desired, in the first aspect, that the patient support surface can include a collapsible section joining the center section to the at least one bolster. The collapsible section can be configured to collapse to expose the surgical accessory rail. The collapsible section can be configured to collapse so that the bolster is moved inward toward the center section. The collapsible section can include collapsible foam. The collapsible section can include diamond cut foam.

It may be contemplated, in the first aspect, that the at least one side panel can be moved to reduce the surface area of the patient support surface. A siderail can be is moved away from the at least one panel prior to moving the at least one panel. The siderail can be folded under the frame prior to moving the at least one panel. The frame can be moved into a flat configuration prior to moving the at least one panel.

In some embodiments of the first aspect a blower can be provided. At least one valve can direct air or suction from the blower through the support surface to at least one of a surgical smoke vacuum inlet, a ventilation and air filtration system to create an air curtain of upwardly flowing filtered air around at least a portion of a perimeter of the patient support surface, and an x-ray bladder of the patient support surface to open an x-ray cassette pocket to facilitate insertion and removal of an x-ray cassette. The blower can be positioned in the patient support surface. The blower can be positioned on the frame. The at least one valve can direct air or suction to at least one of a microclimate management system, a turn assist bladder, a heating and cooling system, an air assisted transfer system, a patient boosting bladder, and a surface width extension and retraction system.

According to a second aspect of the disclosed embodiments, a stretcher for transporting a patient includes a frame and a patient support surface positioned on the frame. The frame includes a center section extending along a length of the frame. A right panel has a right head panel and a right thigh panel. A left panel has a left head panel and a left thigh panel. A right surgical accessory rail and a left surgical accessory rail are provided. The right panel is moveable relative to the center section to expose the right surgical accessory rail. The left panel is moveable relative to the center section to expose the left surgical accessory rail.

In some embodiments of the second aspect, the right panel can move independently of the left panel. The right head panel can move independently of the right thigh panel. The left head panel can move independently of the left thigh panel. Each of the right panel and the left panel can be folded upward to expose the respective surgical accessory rail. Each of the right panel and the left panel can be slid inward to expose the respective surgical accessory rail. Each of the right panel and the left panel can be moveable relative to the center section to reduce a width of the patient support surface.

Optionally, in the second aspect, the patient support surface can include a center section. A right bolster can be positioned on the right panel. A left bolster can be positioned on the left panel. The right bolster can includes a right head bolster positioned on the right head panel. A right thigh bolster can be positioned on the right thigh panel. The left bolster can include a left head bolster positioned on the left head panel. A left thigh bolster can be positioned on the left thigh panel.

It may be desired, in the second aspect, that the patient support surface can include collapsible sections joining the center section to each of the right bolster and the left bolster. The collapsible sections can be configured to collapse to expose the surgical accessory rail. The collapsible sections can be configured to collapse so that the right bolster and the left bolster are moved inward toward the center section. The collapsible sections can include collapsible foam. The collapsible sections can include diamond cut foam.

It may be desired, in the second aspect, that a blower can be provided. At least one valve can direct air or suction from the blower through the support surface to at least one of a surgical smoke vacuum inlet, a ventilation and air filtration system to create an air curtain of upwardly flowing filtered air around at least a portion of a perimeter of the patient support surface, and an x-ray bladder of the patient support surface to open an x-ray cassette pocket to facilitate insertion and removal of an x-ray cassette. The blower can be positioned in the patient support surface. The blower can be positioned on the frame. The at least one valve can direct air or suction to at least one of a microclimate management system, a turn assist bladder, a heating and cooling system, an air assisted transfer system, a patient boosting bladder, and a surface width extension and retraction system.

According to a third aspect of the disclosed embodiments, a stretcher for transporting a patient includes a frame, a patient support surface positioned on the frame, and a blower. At least one valve directs air or suction from the blower through the support surface to at least one of a surgical smoke vacuum inlet, a ventilation and air filtration system to create an air curtain of upwardly flowing filtered air around at least a portion of a perimeter of the patient support surface, and an x-ray bladder of the patient support surface to open an x-ray cassette pocket to facilitate insertion and removal of an x-ray cassette.

In some embodiment of the third aspect, the blower can be positioned in the patient support surface. The blower can be positioned on the frame. The at least one valve can direct air or suction to at least one of a microclimate management system, a turn assist bladder, a heating and cooling system, an air assisted transfer system, a patient boosting bladder, and a surface width extension and retraction system. The frame can include at least one panel that is moveable to expose a surgical accessory rail.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
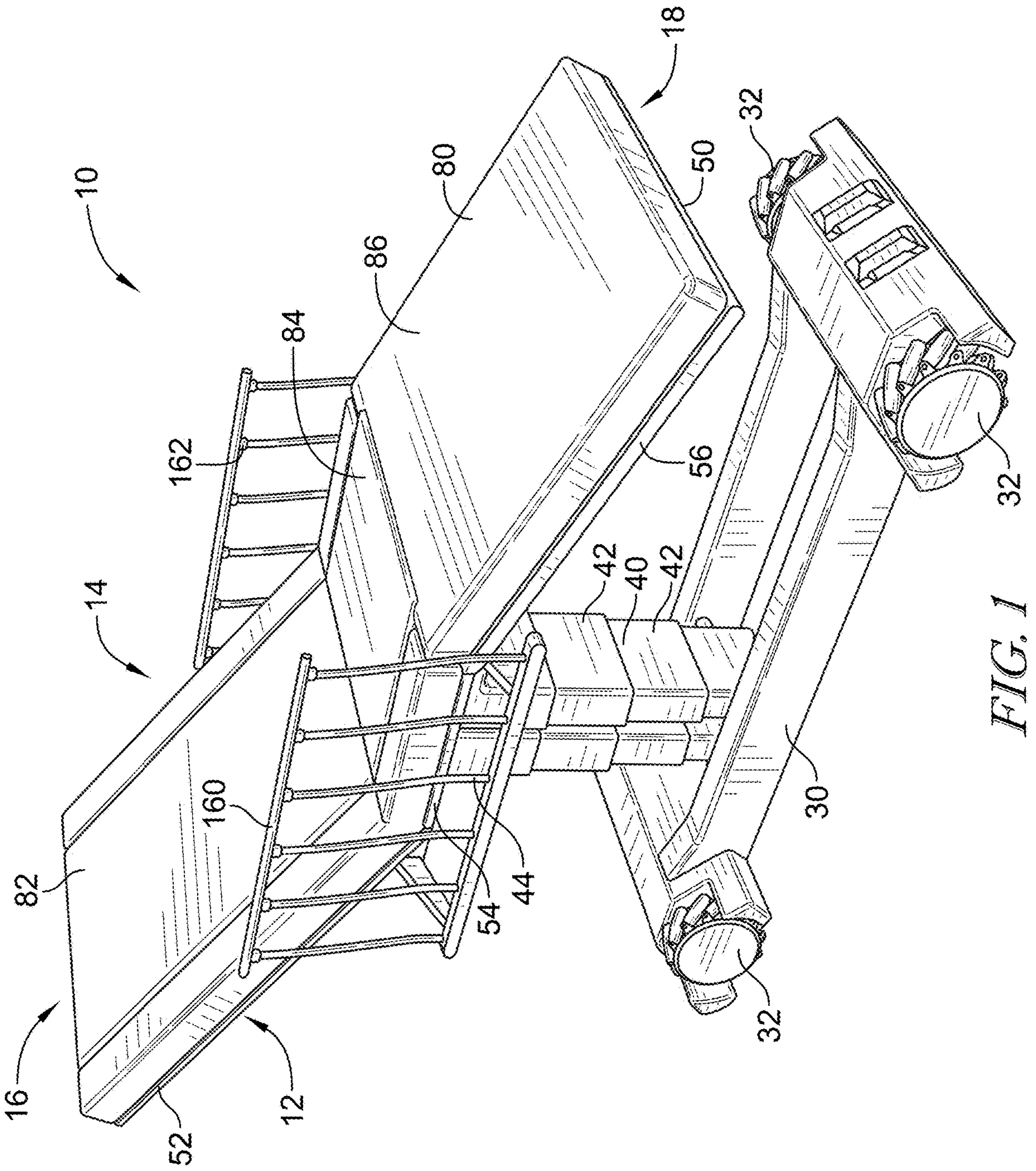
FIG. 1 is a side perspective view of a stretcher in accordance with an embodiment, wherein bolsters of the stretcher are in an extended position and a rails of the stretcher are in a raised position.

Referring now to FIG. 1, a patient support apparatus, embodied as a stretcher 10, is described herein with respect to a patient lying supine on the stretcher 10 so that a right side of the patient is adjacent a right side 12 of the stretcher 10, and a left side of the patient is adjacent a left side 14 of the stretcher 10. Additionally, a head of the patient is positioned adjacent a head end 16 of the stretcher 10, and feet of the patient are positioned adjacent a foot end 18 of the stretcher 10. The stretcher 10 includes a lower frame 30 having a plurality of casters 32 that enable the stretcher to be moved throughout a healthcare facility. In some embodiments, the casters 32 include locks or brakes (not shown) to limit movement of the stretcher 10 across a floor. In the disclosed embodiment, casters 32 include one or more motorized wheels as shown and described in U.S. application Ser. No. 18/177,837, filed Mar. 3, 2023, and titled PATIENT SUPPORT APPARATUS HAVING MOTORIZED WHEELS (see particularly, FIGS. 25A-28F and the related discussion of non-swivelable mecanum wheels) which is hereby incorporated herein by reference in its entirety for the disclosure of an applicable caster arrangement and to the extent not inconsistent with the present disclosure which shall control as to any inconsistency.

A lift column 40 extends upward from the lower frame 30 and is operable to raise and lower an upper deck 50 vertically relative to the floor. In the illustrated embodiment, the column 40 includes a plurality of telescoping sections 42 that enable the column to extend and retract to raise and lower an upper deck 50 coupled to a top 44 of the column 40. The lift column 40 is powered by a hydraulic system such as that disclosed in U.S. Patent Publication No. 2005/0198737A1, published on Sep. 15, 2005 and titled HYDRAULIC LIFT APPARATUS FOR A PATIENT SUPPORT," which is incorporated herein by reference for the disclosure of an applicable hydraulic lift system. Movement of the column 40 between a retracted and extended position is controlled with foot pedals (not shown), in some embodiments. In other embodiments, the column 40 may include an electric motor or manually actuable hydraulic system. In some embodiments, the operation of the column 40 may be controlled by foot pedals. Other mechanisms for moving the column 40 between the retracted position and the extended position are contemplated.

Figure 2:
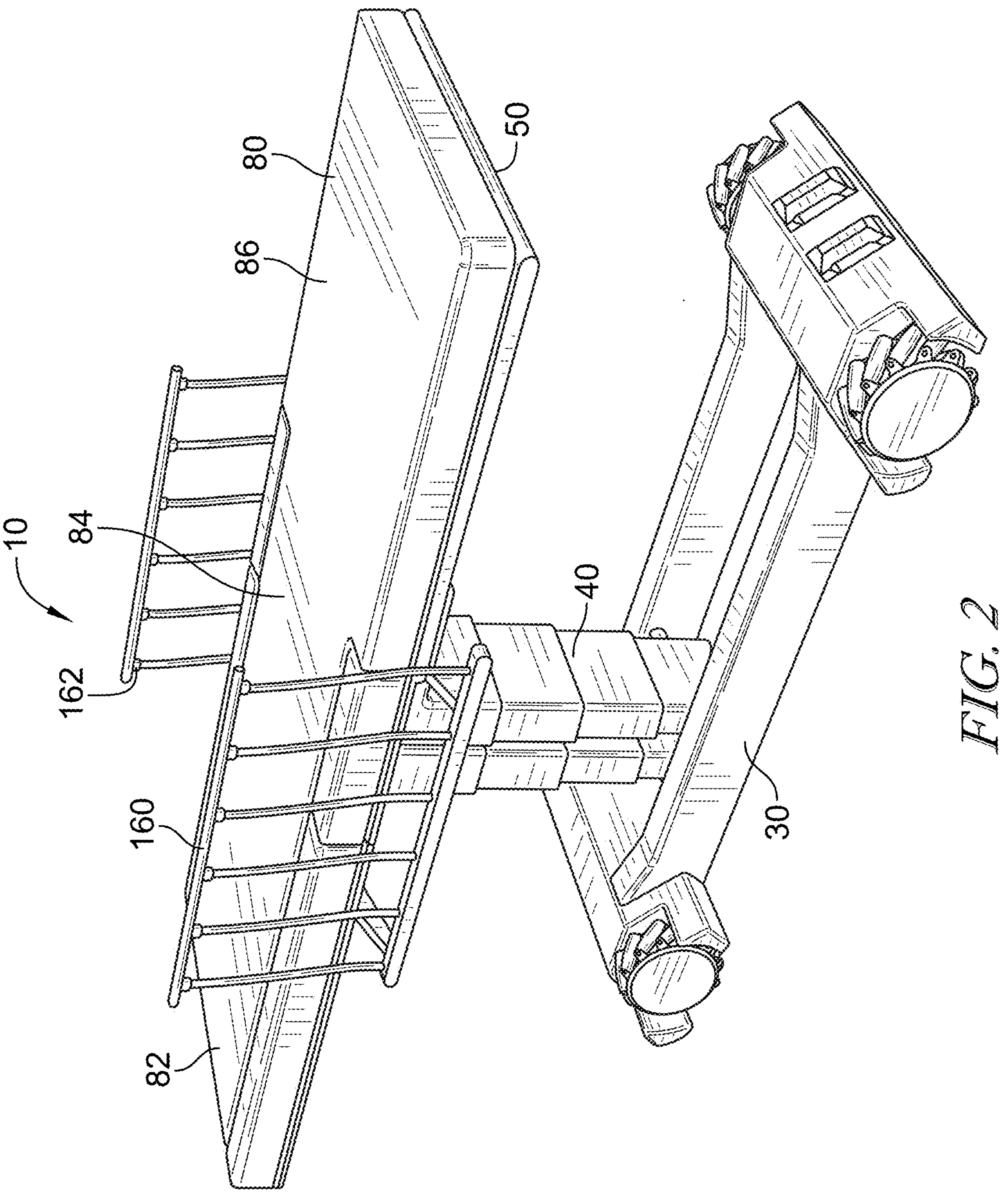
FIG. 2 is a side perspective view of the stretcher shown FIG. 1, wherein a frame of the stretcher is in a flat configuration.

The upper deck 50 extends between the head end 16 and the foot end 18. The upper deck 50 includes a head section 52 positioned adjacent the head end 16, a thigh section 54 adjacent the head section 52 and supported on the column 40, and a leg section 56 extending from the thigh section 54 adjacent the foot end 18. The thigh section 54 extends between the head section 52 and the leg section 56. The thigh section 54 is pivotably coupled to the top 44 of the column 40 and movable relative to the thigh section 54 as suggested by FIGS. 1 and 2. The head section 52 pivots relative to the thigh section 54 between a raised position and a lowered position as suggested by FIGS. 1 and 2. Movement of the head section 52 between the raised position and the lowered position is controlled by user inputs as is known in art, including the use of foot pedals, in some embodiments. In some embodiments, movement of the head section 52 between the raised position and the lowered position is manually controlled with the assistance of a gas spring as known in the art. Other mechanisms for moving the head section 52 between the raised position and the lowered position are contemplated, including electric actuators and powered hydraulic cylinders. Movement of the leg section 56 between the raised position and the lowered position is controlled by user inputs as is known in art, including the use of foot pedals, in some embodiments. In some embodiments, movement of the foot section 56 between the raised position and the lowered position is manually controlled with the assistance of a gas spring as known in the art. In some embodiments, movement of the leg section 56 between the raised position and the lowered position is manually controlled. Other mechanisms for moving the leg section 56 between the raised position and the lowered position are contemplated including electric actuators and powered hydraulic cylinders. When the head section 52 is in the lowered position and the leg section 56 is in the raised position, the upper deck 50 is in a flat configuration, as illustrated in FIG. 2.

Figure 3:
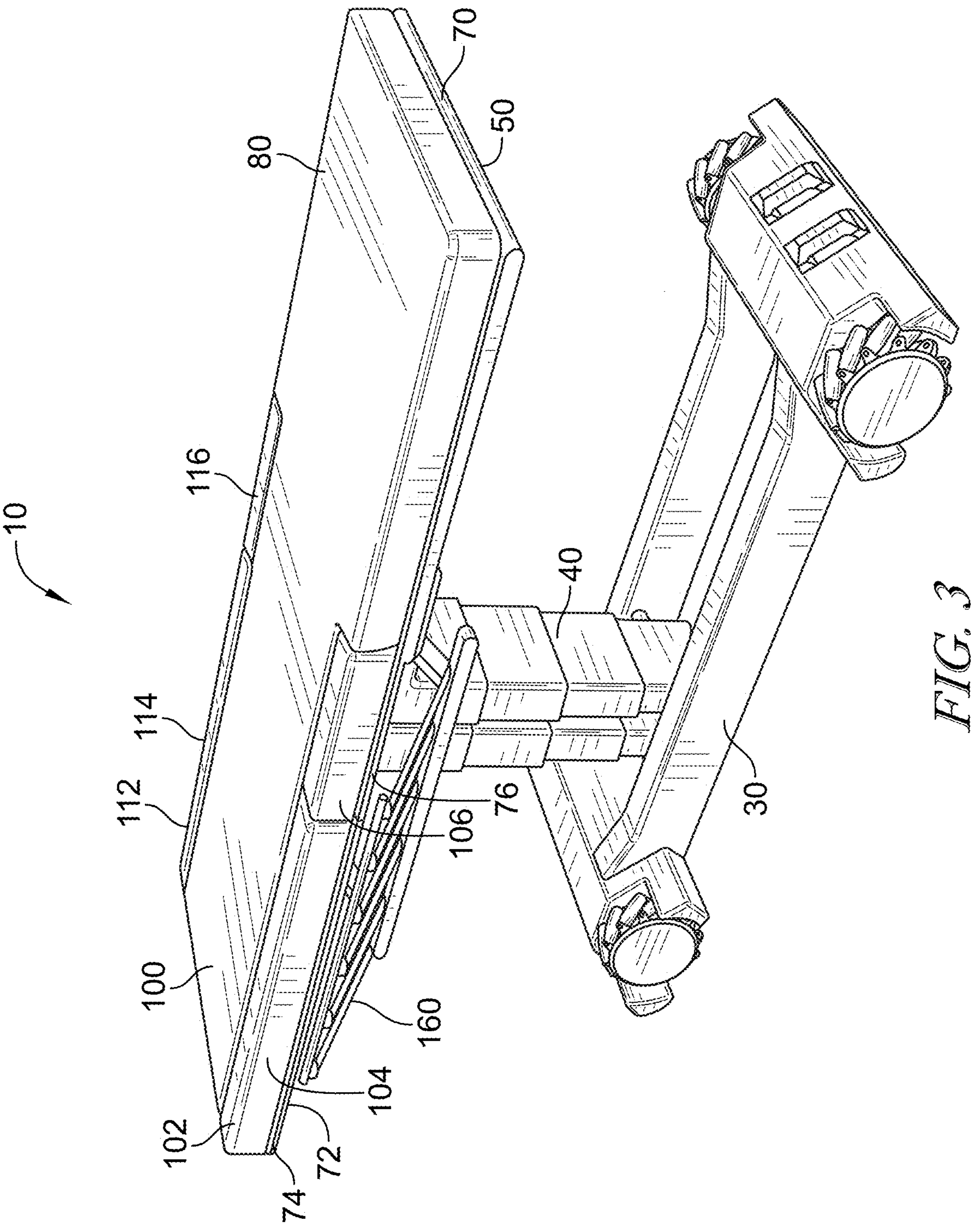
FIG. 3 is a side perspective view of the stretcher shown FIG. 1, wherein the rails of the stretcher are in a lowered position between the raised position and a collapsed position.
Figure 4:
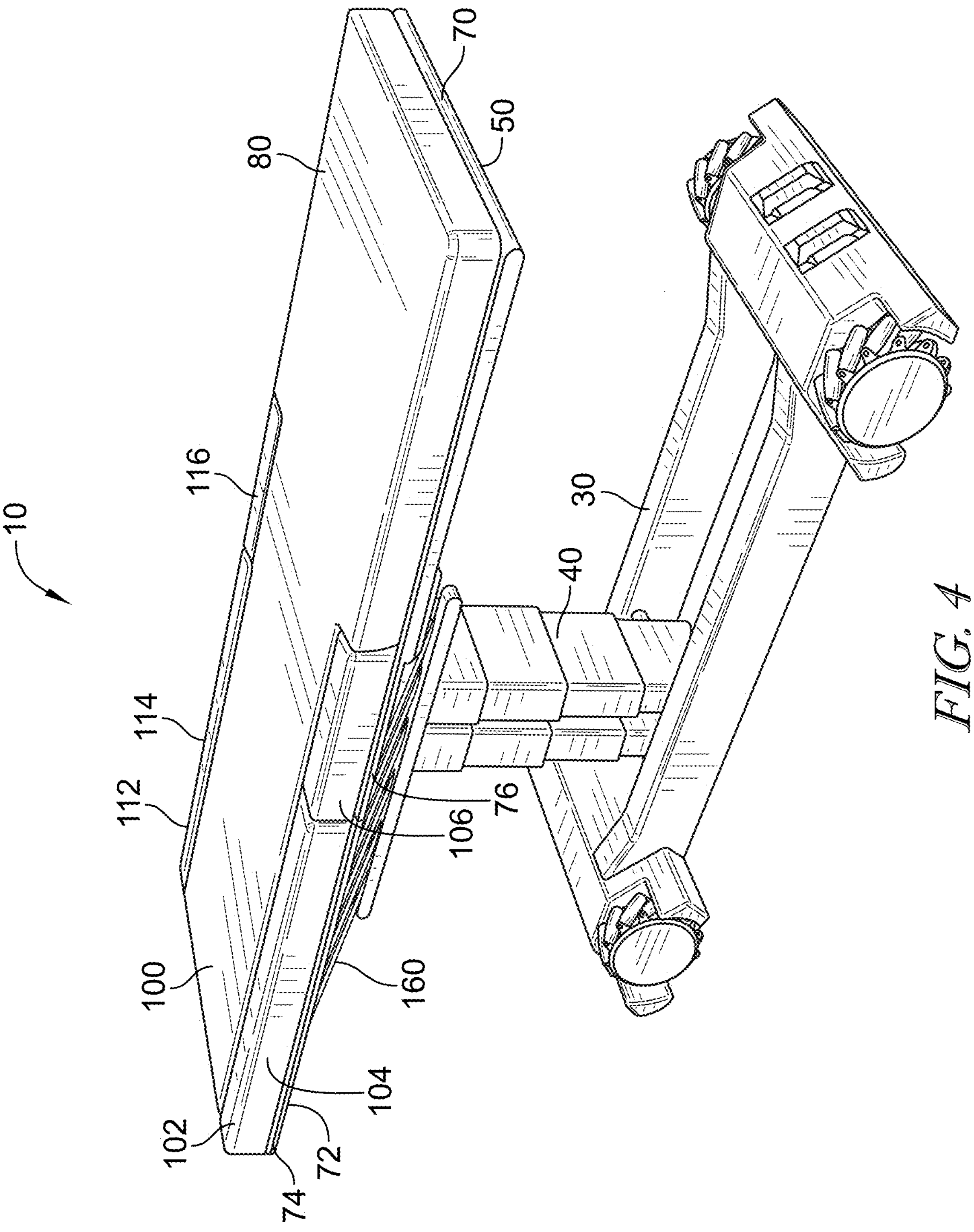
FIG. 4 is a side perspective view of the stretcher shown FIG. 1, wherein the rails of the stretcher are in the collapsed position.

Referring to FIG. 3, a patient support surface 80 is positioned on the upper deck 50 and extends from the head end 16 to the foot end 18. A head section 82 of the patient support surface 80 is positioned on the head section 52 and moves with the head section 52. A thigh section 84 of the patient support surface 80 is positioned on the thigh section 54 and moves with the thigh section 54. A leg section 86 is positioned on the leg section 56 and moves with the leg section 56. The thigh section 84 extends between the head section 82 and the leg section 86.

As illustrated best in FIGS. 3-6, the patient support surface 80 includes a main section 100 extending from the head end 16 to the foot end 18. A right side bolster section 102 extends along a right edge of the main section 100 along the right side 12 of the stretcher 10. The right side bolster section 102 includes a right head bolster 104 and a right thigh bolster 106. The right head bolster 104 extends along the head section 82 of the patient support surface 80. The right head bolster 104 is positioned on a right head panel 74 and moves with the right head panel 74 between extended and retracted positions. The right thigh bolster 106 extends along the thigh section 86. The right thigh bolster 106 is positioned on a right thigh panel 76 and moves with the right thigh panel 76 between extended and retracted positions. The right head panel 76 and the right thigh panel 74 move independently of each other and thus, the right head bolster 104 and the right thigh bolster 106 move independently of one another. As shown best in FIGS. 3-6, the upper deck 50 includes a center frame 70 extending a length of stretcher 10 from the head end 16 to the foot end 18. A right side panel 72 extends along a right edge of the center frame 70 along the right side 12 of the stretcher 10. The right side panel 72 includes a right head panel 74 and a right thigh panel 76. The right head panel 74 is positioned in the head section 52 of the upper deck 50, and the right thigh panel 76 is positioned in the thigh section 54 of the upper deck 50 adjacent the right head panel 74. The right head panel 74 and the right thigh panel 76 are hingedly coupled to the center frame 70 so that the right head panel 74 and the right thigh panel 76 rotate relative to the center frame 70 between an extended position (shown in FIG. 1) and a retracted position (shown in FIG. 6). The right head panel 74 and the right thigh panel 76 move independently of one another, in some embodiments.

A left side panel 92 (shown in FIG. 6) extends along a left edge of the center frame 70 along the left side 14 of the stretcher 10. The left side panel 92 includes a left head panel 94 and a left thigh panel 96. The left head panel 94 is positioned in the head section 52 of the upper deck 50, and the left thigh panel 96 is positioned in the thigh section 54 of the upper deck 50 adjacent the left head panel 94. The left head panel 94 and the left thigh panel 96 are hingedly coupled to the center frame 70 so that the left head panel 94 and the left thigh panel 96 rotate relative to the center frame 70 between an extended position (shown in FIG. 1) and a retracted position (shown in FIG. 6). The left head panel 94 and the left thigh panel 96 move independently of one another, in some embodiments. The right side panel 72 and the left side panel 92 move independently of one another, in some embodiments.

A left side bolster 112 extends along a left edge of the center frame 70 along the left side 14 of the stretcher 10. The left side bolster 112 includes a left head bolster 114 and a left thigh bolster 116. The left head bolster 114 extends along the head section 82. The left head bolster 114 is positioned on the left head panel 94 and moves with the left head panel 94 between the extended and retracted positions. The left thigh bolster 116 extends along the thigh section 86. The left thigh bolster 116 is positioned on the left thigh panel 96 and moves with the left thigh panel 96 between the extended and retracted positions. The left head bolster 114 and the left thigh bolster 116 move independently of one another, in some embodiments. The left side bolster 112 and the right side bolster 102 move independently of one another, in some embodiments.

Each of the bolsters 104, 106, 114, and 116 are moveable relative to the center section 100 to a retracted position to reduce a surface area of the patient support surface 80. The panels 74, 76, 94, and 96 and the respective bolsters 104, 106, 114, and 116 are moveable relative to the center section 100 to reduce a width 120 of the patient support surface 80 between a right edge 122 and a left edge 124 of the patient support surface 80. The right edge 122 of the patient support surface 80 extends along the right side 12 of the stretcher 10, and the left edge 124 of the patient support surface 80 extends along the left side 14 of the stretcher 10. In some embodiments, the upper deck 50 is moved into the flat configuration (shown in FIG. 2) before the bolsters 104, 106, 114, and 116 are moved relative to the center section 100 to reduce the surface area of the patient support surface 80.

A right siderail 160 extends along the right side 12 of the stretcher 10. A left siderail 162 extends along the left side 14 of the stretcher 10. FIG. 3 illustrates the siderails 160, 162 of the stretcher 10 lowered to a position between a raised position (shown in FIG. 1) and a collapsed position (shown in FIG. 4. In some embodiments, the siderails 160, 162 are moved away from the bolsters 104, 106, 114, and 116 prior to moving the bolsters 104, 106, 114, and 116 relative to the center section 100 of the patient support surface 80. As shown, in FIG. 4, in some embodiments, the siderails 160, 162 are folded under the upper deck 50 prior to moving the bolsters 104, 106, 114, and 116 relative to the center section 100 of the patient support surface 80.

Figure 5:
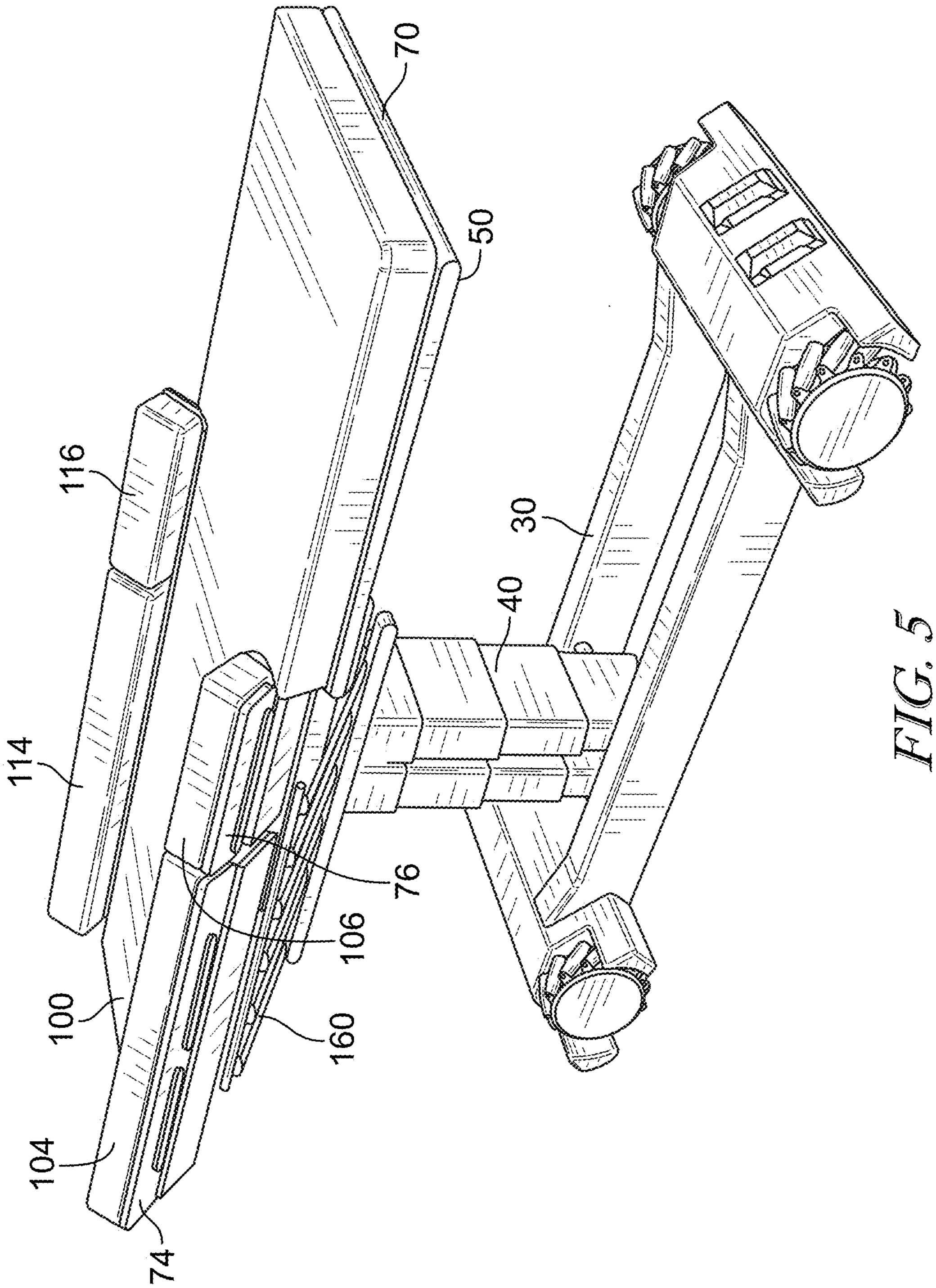
FIG. 5 is a side perspective view of the stretcher shown FIG. 1, wherein the bolsters are in a position between the extended position and a retracted position.
Figure 6:
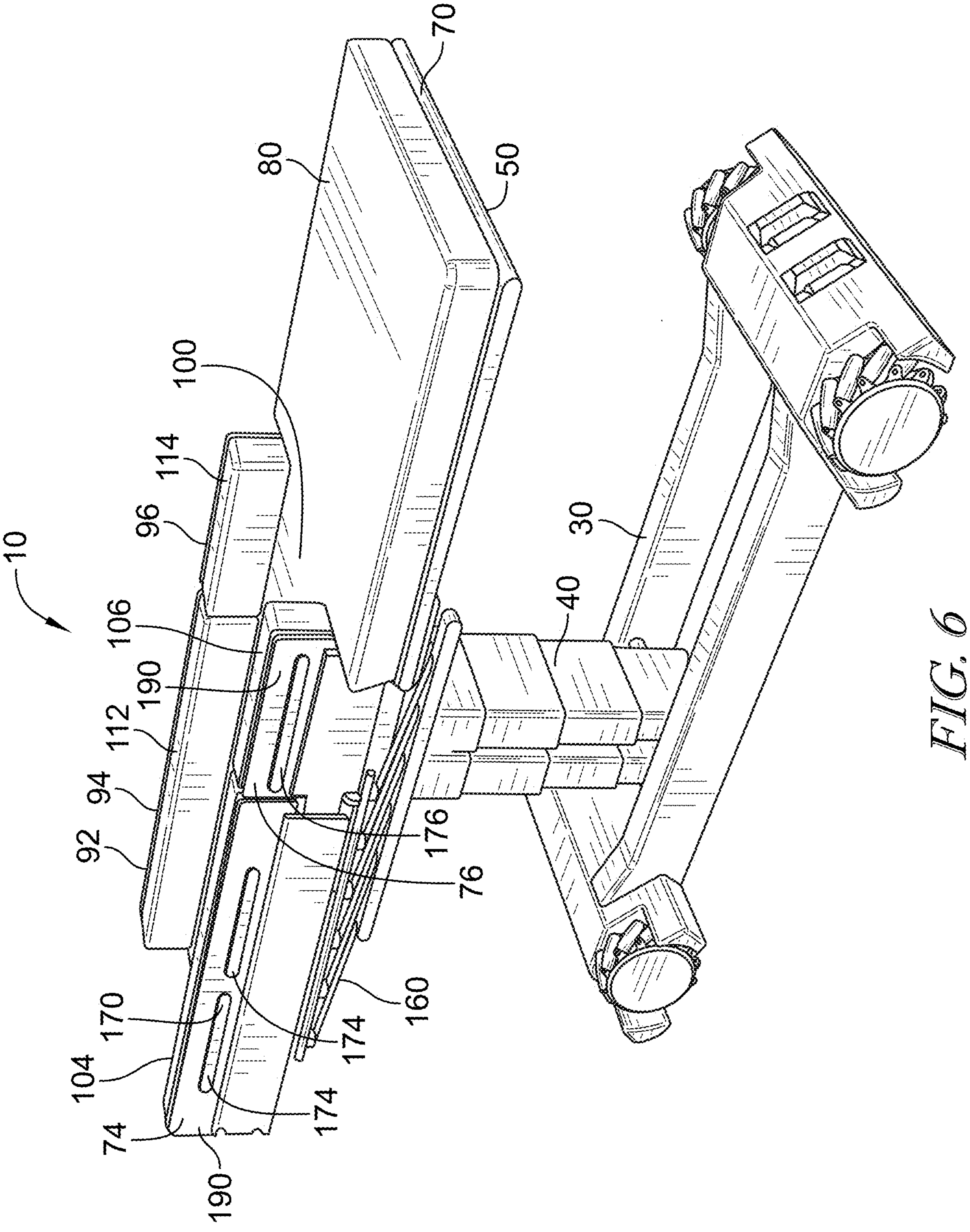
FIG. 6 is a side perspective view of the stretcher shown FIG. 1, wherein the bolsters are in the retracted position.

Referring to FIGS. 5 and 6, the bolsters 104, 106, 114, and 116 are illustrated being moved to a retracted position, wherein FIG. 5 illustrates the bolsters 104, 106, 114, and 116 in a position between the extended position and the retracted position, and FIG. 6 illustrates the bolsters 104, 106, 114, and 116 in the retracted position. Specifically, the right side panel 72 and the left side panel 92 are hingedly rotated or folded upward relative to the center frame 70 to rotate the right side bolster 102 and the left side bolster 112 into the retracted position and to reduce the surface area of the patient support surface 80. In the illustrated embodiment, each of the right head panel 74, the right thigh panel 76, the left head panel 94, and the left thigh panel 96 are rotated either individually or concurrently to move the right head bolster 104, the right thigh bolster 106, the left head bolster 114 and a left thigh bolster 116 into the retracted position. It will be appreciated that the panels are separately rotatable so that any combinations of panels are moveable to the retracted position, thereby placing any combination of bolsters 104, 106, 114, and 116 in the retracted position.

In the retracted position, the upper deck 50 and the patient support surface 80 are effectively narrower to provide a surgeon better patient access during surgery. It will also be appreciated that, in the retracted position, the bolsters 104, 106, 114, and 116 also serve as barriers to position and immobilize a patient during surgical procedures. Further, in the retracted position, a system of surgical accessory rails 170 are exposed on an underside 190 of the right side panel 72 and the left side panel 92. The system of surgical accessory rails 170 are exposed for accessories such as arm boards, leg stirrups, hip pads, and the like to clamp onto during surgery. In the illustrated embodiment, the surgical accessory rails 170 include a pair of right head accessory rails 174 on the underside 190 of the right head panel 74 and a right thigh accessory rail 176 on the right thigh panel 76. It will be appreciated that, in some embodiments, the stretcher 10 includes any number of right head accessory rails 174 and right thigh accessory rails 176. At least one left head accessory rail (not shown, but similar to the right head accessory rails 174) is positioned on an underside of the left head panel 94. At least one left thigh accessory rail (not shown, but identical to the right thigh accessory rail 176) is positioned on an underside of the left thigh panel 96.

Figure 7:
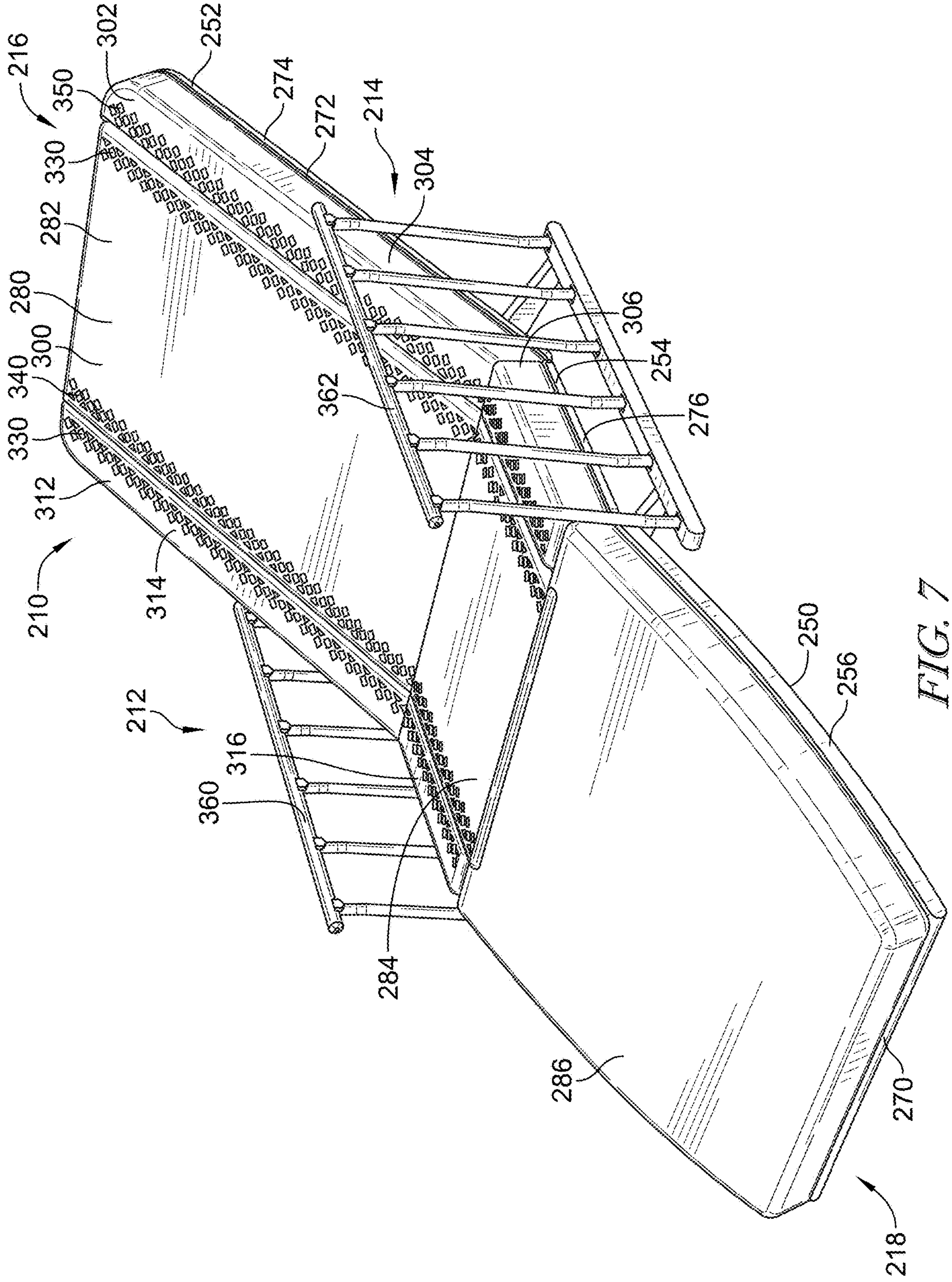
FIG. 7 is a side perspective view of a stretcher in accordance with another embodiment, wherein bolsters of the stretcher are in an extended position and a rails of the stretcher are in a raised position.

Referring now to FIG. 7 and upper deck 250 of a stretcher 210 is described herein with respect to a patient lying supine on the stretcher 210 so that a right side of the patient is adjacent a right side 212 of the stretcher 210, and a left side of the patient is adjacent a left side 214 of the stretcher 210. Additionally, a head of the patient is positioned adjacent a head end 216 of the stretcher 210, and feet of the patient are positioned adjacent a foot end 218 of the stretcher 210. Although the stretcher 210 is illustrated without a lower frame or column, it will be appreciated that, in some embodiments, the lower frame and column of the stretcher 210 are identical to the lower frame 30 and column 40 described above with respect to FIGS. 1-6.

The upper deck 250 extends between the head end 216 and the foot end 218. The upper deck 250 includes a head section 252 positioned adjacent the head end 216, a thigh section 254 extending from the head section 252, and a leg section 256 extending from the thigh section 254 adjacent the foot end 218. The thigh section 254 extends between the head section 252 and the leg section 256. The head section 252 articulates relative to the thigh section 254 between a raised position and a lowered position. Movement of the head section 252 between the raised position and the lowered position is controlled with foot pedals (not shown), in some embodiments. Movement of the head section 252 between the raised position and the lowered position is controlled with user inputs (not shown), in some embodiments. In some embodiments, movement of the head section 252 between the raised position and the lowered position is manually controlled. Other mechanisms for moving the head section 252 between the raised position and the lowered position are contemplated. The leg section 256 articulates relative to the thigh section 254 between a raised position and a lowered position. Movement of the leg section 256 between the raised position and the lowered position is controlled with foot pedals (not shown), in some embodiments. Movement of the leg section 256 between the raised position and the lowered position is controlled with user inputs (not shown), in some embodiments. In some embodiments, movement of the leg section 256 between the raised position and the lowered position is manually controlled. Other mechanisms for moving the leg section 256 between the raised position and the lowered position are contemplated. When the head section 252 is in the lowered position and the leg section 256 is in the raised position, the upper deck 250 is in a flat configuration.

The upper deck 250 includes a center frame 270 extending a length of stretcher 210 from the head end 216 to the foot end 218. A left side panel 272 extends along a left edge of the center frame 270 along the left side 214 of the stretcher 210. The left side panel 272 includes a left head panel 274 and a left thigh panel 276. The left head panel 274 is positioned in the head section 252 of the upper deck 250, and the left thigh panel 276 is positioned in the thigh section 254 of the upper deck 250 adjacent the left head panel 274. The left head panel 274 and the left thigh panel 276 are slidably coupled to the center frame 270 so that the left head panel 274 and the left thigh panel 276 move relative to the center frame 270 between an extended position (shown in FIG. 7) and a retracted position (shown in FIG. 11), wherein the left head panel 274 and the left thigh panel 276 are slid under the center frame 270. The left head panel 274 and the left thigh panel 276 move independently of one another, in some embodiments.

A right side panel (not shown, but identical to the left side panel 272) extends along a right edge of the center frame 270 along the right side 212 of the stretcher 210. The right side panel includes a right head panel and a right thigh panel. The right head panel is positioned in the head section 252 of the upper deck 250, and the right thigh panel is positioned in the thigh section 254 of the upper deck 250 adjacent the right head panel. The right head panel and the right thigh panel are slidably coupled to the center frame 270 so that the right head panel and the right thigh panel move relative to the center frame 270 between an extended position (shown in FIG. 7) and a retracted position (shown in FIG. 11), wherein the right head panel and the right thigh panel are slid under the center frame 270. The right head panel and the right thigh panel move independently of one another, in some embodiments. The left side panel 272 and the right side panel move independently of one another, in some embodiments.

A patient support surface 280 is positioned on the upper deck 250 and extends from the head end 216 to the foot end 218. A head section 282 of the patient support surface 280 is positioned on the head section 252 and moves with the head section 252. A thigh section 284 of the patient support surface 280 extends from the head section 282. The thigh section 284 is positioned on the thigh section 254 and moves with the thigh section 254. A leg section 286 extends from the thigh section 284. The leg section 286 is positioned on the leg section 256 and moves with the leg section 256. The thigh section 284 extends between the head section 282 and the leg section 286.

The patient support surface 280 includes a center section 300 extending from the head end 216 to the foot end 218. A left side bolster 302 extends along a left edge of the center section 300 along the left side 214 of the stretcher 210. The left side bolster 302 includes a left head bolster 304 and a left thigh bolster 306. The left head bolster 304 extends along the head section 282. The left head bolster 304 is positioned on the left head panel 274 and moves with the left head panel 274 between the extended and retracted positions. The left thigh bolster 306 extends along the thigh section 286. The left thigh bolster 306 is positioned on the left thigh panel 276 and moves with the left thigh panel 276 between the extended and retracted positions. The left head bolster 304 and the left thigh bolster 306 move independently of one another, in some embodiments.

A right side bolster 312 extends along a left edge of the center frame 270 along the right side 212 of the stretcher 210. The right side bolster 312 includes a right head bolster 314 and a right thigh bolster 316. The right head bolster 314 extends along the head section 282. The right head bolster 314 is positioned on the right head panel and moves with the right head panel between the extended and retracted positions. The right thigh bolster 316 extends along the thigh section 286. The right thigh bolster 316 is positioned on the right thigh panel and moves with the right thigh panel between the extended and retracted positions. The right head bolster 314 and the right thigh bolster 316 move independently of one another, in some embodiments. The right side bolster 312 and left right side bolster 302 move independently of one another, in some embodiments.

Each of the bolsters 304, 306, 314, and 316 are moveable relative to the center section 300 to a retracted position to reduce a surface area of the patient support surface 280. The bolsters 304, 306, 314, and 316 are moveable relative to the center section 300 to reduce a width 320 of the patient support surface 280 between a right edge 322 and a left edge 324 of the patient support surface 280. The right edge 322 of the patient support surface 280 extends along the right side 212 of the stretcher 210, and the left edge 324 of the patient support surface 280 extends along the left side 214 of the stretcher 210.

Figures 9, 10:
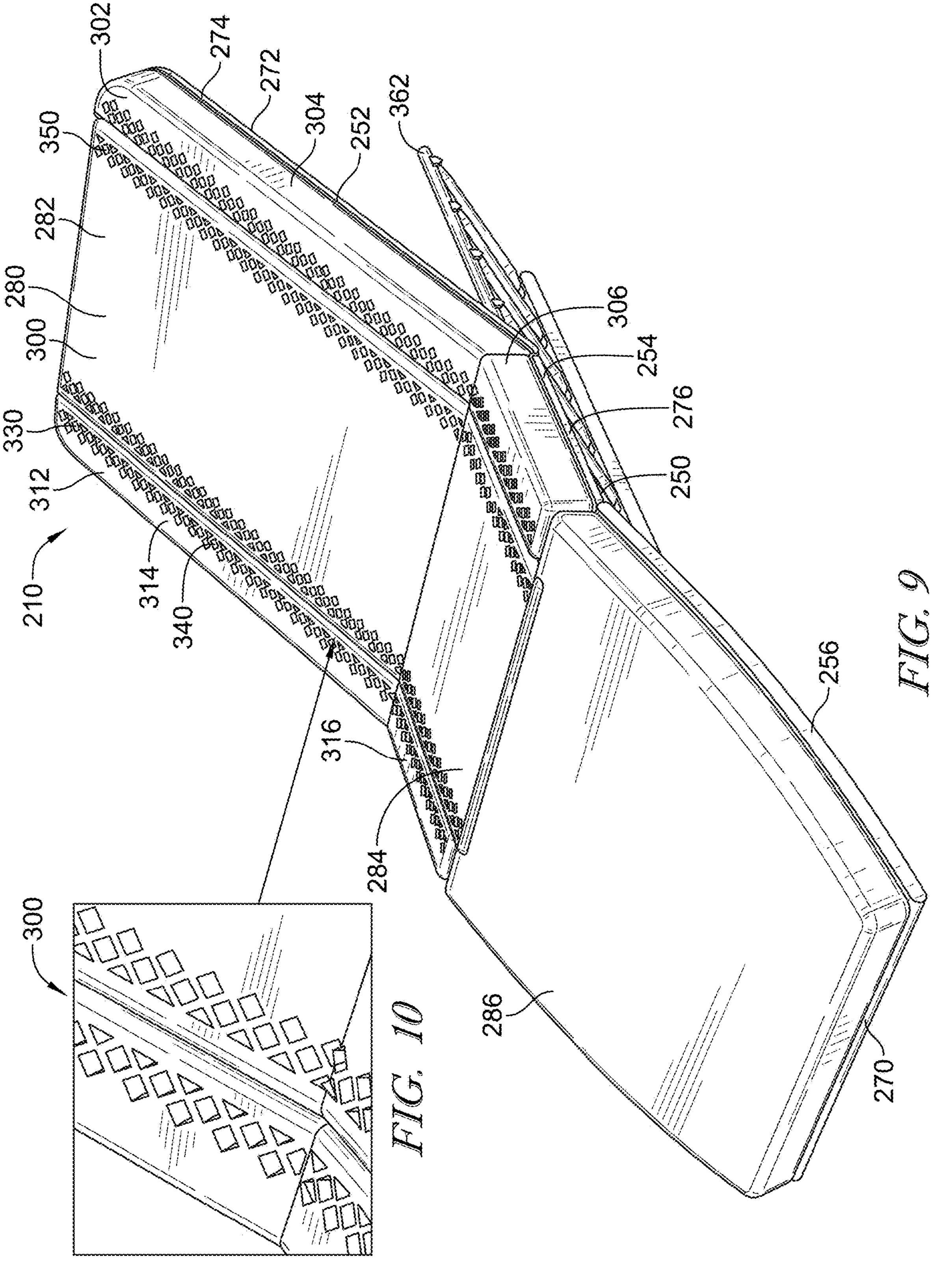
FIG. 9 is a side perspective view of the stretcher shown FIG. 7, wherein the rails of the stretcher are in the collapsed position.
FIG. 10 is an exploded view of the patient support surface of the stretcher shown in FIG. 7.

The patient support surface 280 includes collapsible sections 330 joining the center section 300 to each bolster 304, 306, 314, and 316. The collapsible sections 330 are configured to collapse to reduce the surface area of the patient support surface 280. The collapsible sections 330 are configured to collapse so that the respective bolster 304, 306, 314, and 316 is moved inward toward the center section 300. In some embodiments, the collapsible sections 330 include a collapsible foam. In some embodiments, as shown in FIG. 10, the collapsible sections 330 include a diamond cut foam. A right collapsible section 340 is configured to collapse so that the right side bolster 312 is moved inward toward the center section 330. The right collapsible section 340 includes a right head collapsible section 342 joining the right head bolster 314 and the center section 300, and a right thigh collapsible section 344 joining the right thigh bolster 316 and the center section 300. A left collapsible section 350 is configured to collapse so that the left side bolster 302 is moved inward toward the center section 330. The left collapsible section 350 includes a left head collapsible section 352 joining the left head bolster 304 and the center section 300, and a left thigh collapsible section 354 joining the left thigh bolster 306 and the center section 300.

Figure 8:
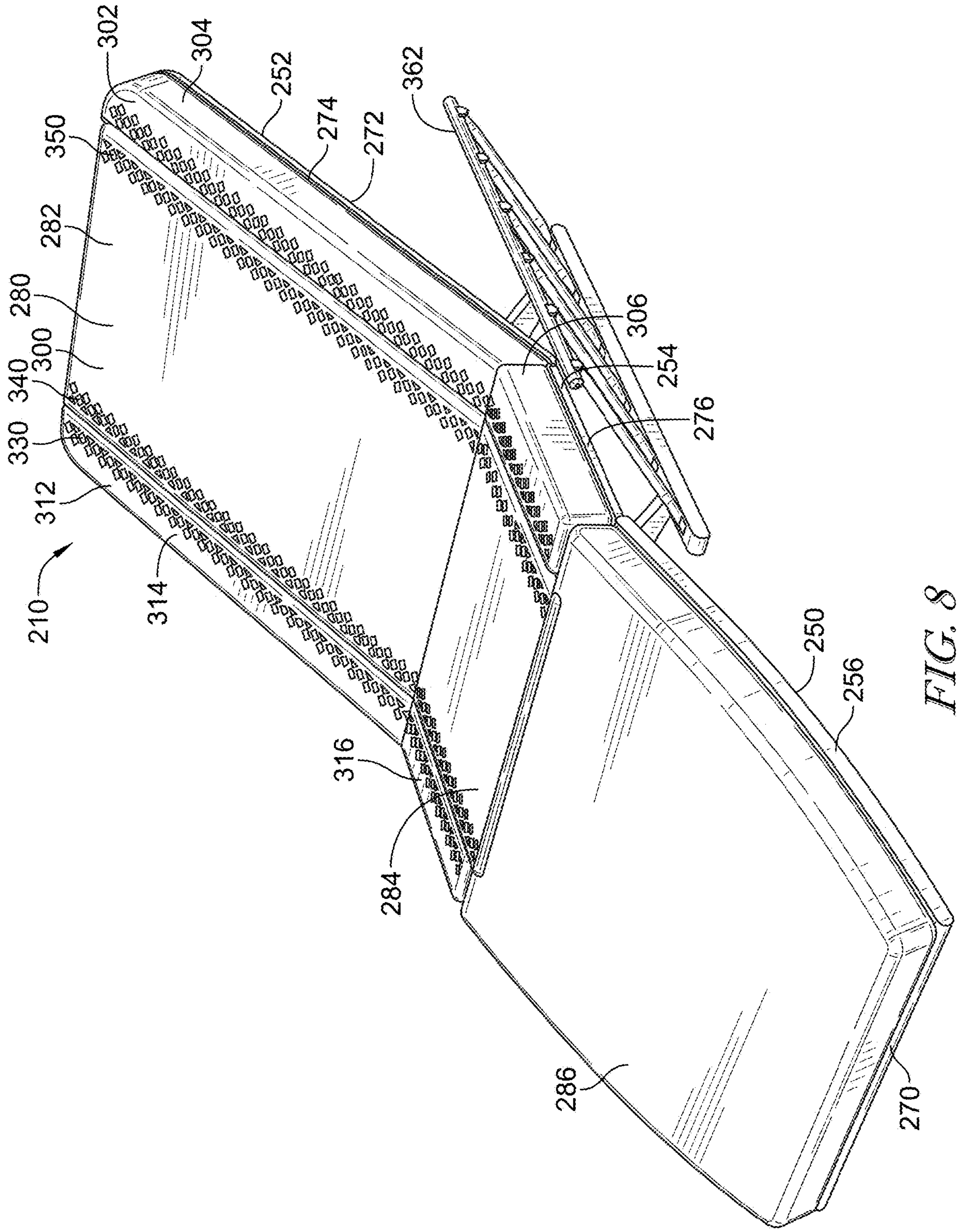
FIG. 8 is a side perspective view of the stretcher shown FIG. 7, wherein the rails of the stretcher are in a lowered position between the raised position and a collapsed position.

A right siderail 360 extends along the right side 212 of the stretcher 210. A left siderail 362 extends along the left side 214 of the stretcher 210. FIG. 8 illustrates the siderails 360, 362 of the stretcher 210 lowered to a position between a raised position (shown in FIG. 7) and a collapsed position (shown in FIG. 9. In some embodiments, the siderails 360, 362 are moved away from the bolsters 304, 306, 314, and 316 prior to moving the bolsters 304, 306, 314, and 316 relative to the center section 300 of the patient support surface 280. As shown, in FIG. 9, in some embodiments, the siderails 360, 362 are folded under the upper deck 250 prior to moving the bolsters 304, 306, 314, and 316 relative to the center section 300 of the patient support surface 280.

Figure 11:
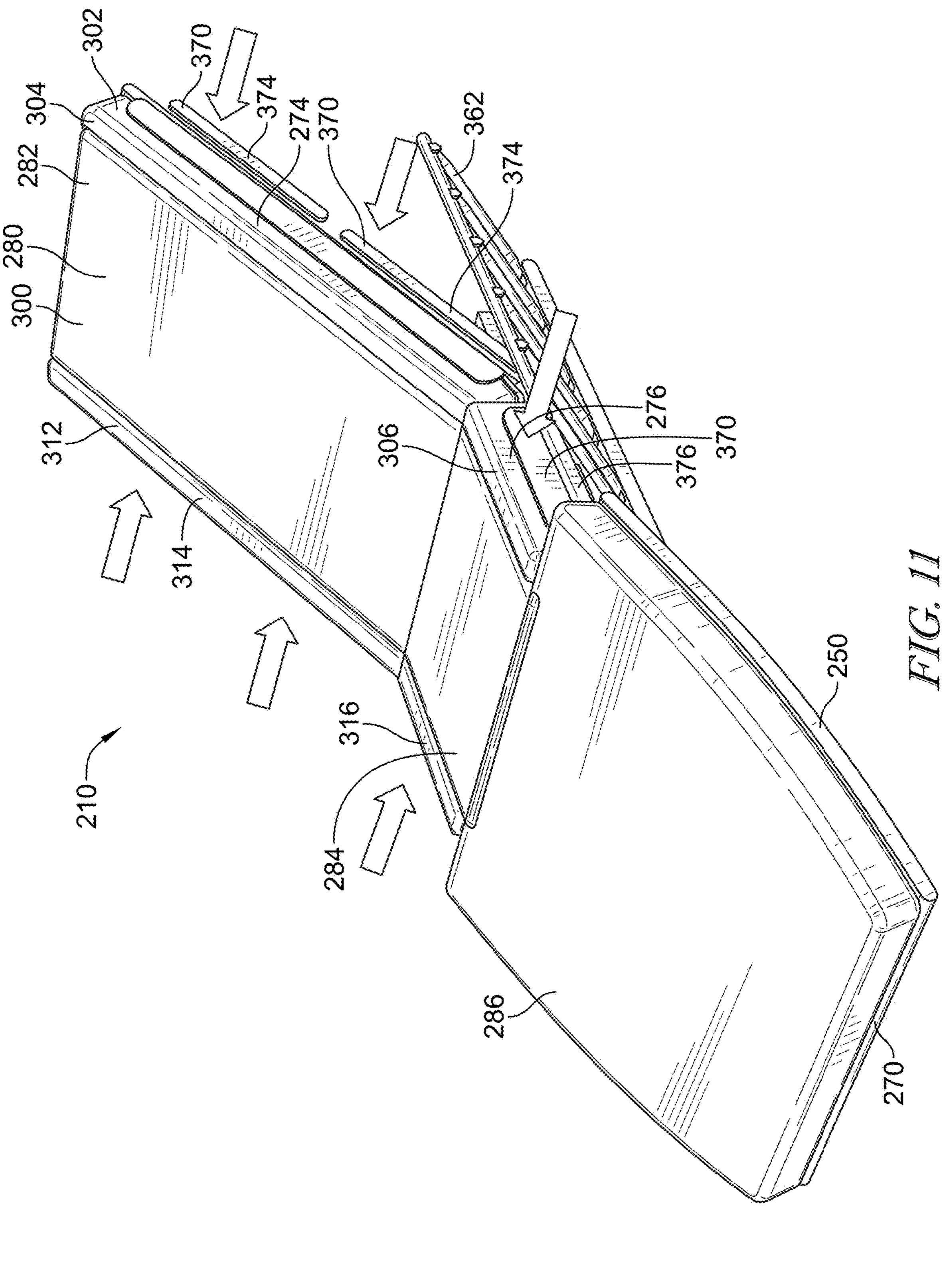
FIG. 11 is a side perspective view of the stretcher shown FIG. 7, wherein the bolsters are in the retracted position.

Referring to FIG. 11, the bolsters 304, 306, 314, and 316 are illustrated in a retracted position. Specifically, the left side panel 272 and the right side panel are moved or slid inward relative to and under the center frame 270, thereby moving the left side bolster 302 and the right side bolster 312 into the retracted position by compressing or collapsing the respective collapsible sections 340, 350 to reduce the surface area of the patient support surface 280. In the illustrated embodiment, each of the left head panel 274, the left thigh panel 276, the right head panel, and the right thigh panel are moved either individually or concurrently to move the left head bolster 304, the left thigh bolster 306, the right head bolster 314 and a right thigh bolster 316 into the retracted position. It will be appreciated that the panels are separately moveable so that any combinations of panels are moveable to the retracted position, thereby placing any combination of bolsters 304, 306, 314, and 316 in the retracted position.

In the retracted position, the upper deck 250 and the patient support surface 280 are effectively narrower to provide a surgeon better patient access during surgery. Further, in the retracted position, a plurality of surgical accessory rails 370 are exposed under the left side panel 272 and the right side panel. The surgical accessory rails 370 are exposed for accessories such as arm boards, leg stirrups, hip pads, and the like to clamp onto during surgery. In the illustrated embodiment, the surgical accessory rails 370 include a pair of left head accessory rails 374 under the left head panel 274 and a left thigh accessory rail 376 under the left thigh panel 276. It will be appreciated that, in some embodiments, the stretcher 210 includes any number of left head accessory rails 374 and left thigh accessory rails 376. At least one right head accessory rail (not shown, but substantially identical to the left head accessory rails 374) is positioned on the right head panel. At least one right thigh accessory rail (not shown, but identical to the left thigh accessory rail 376) is positioned on the right thigh panel.

Figure 12:
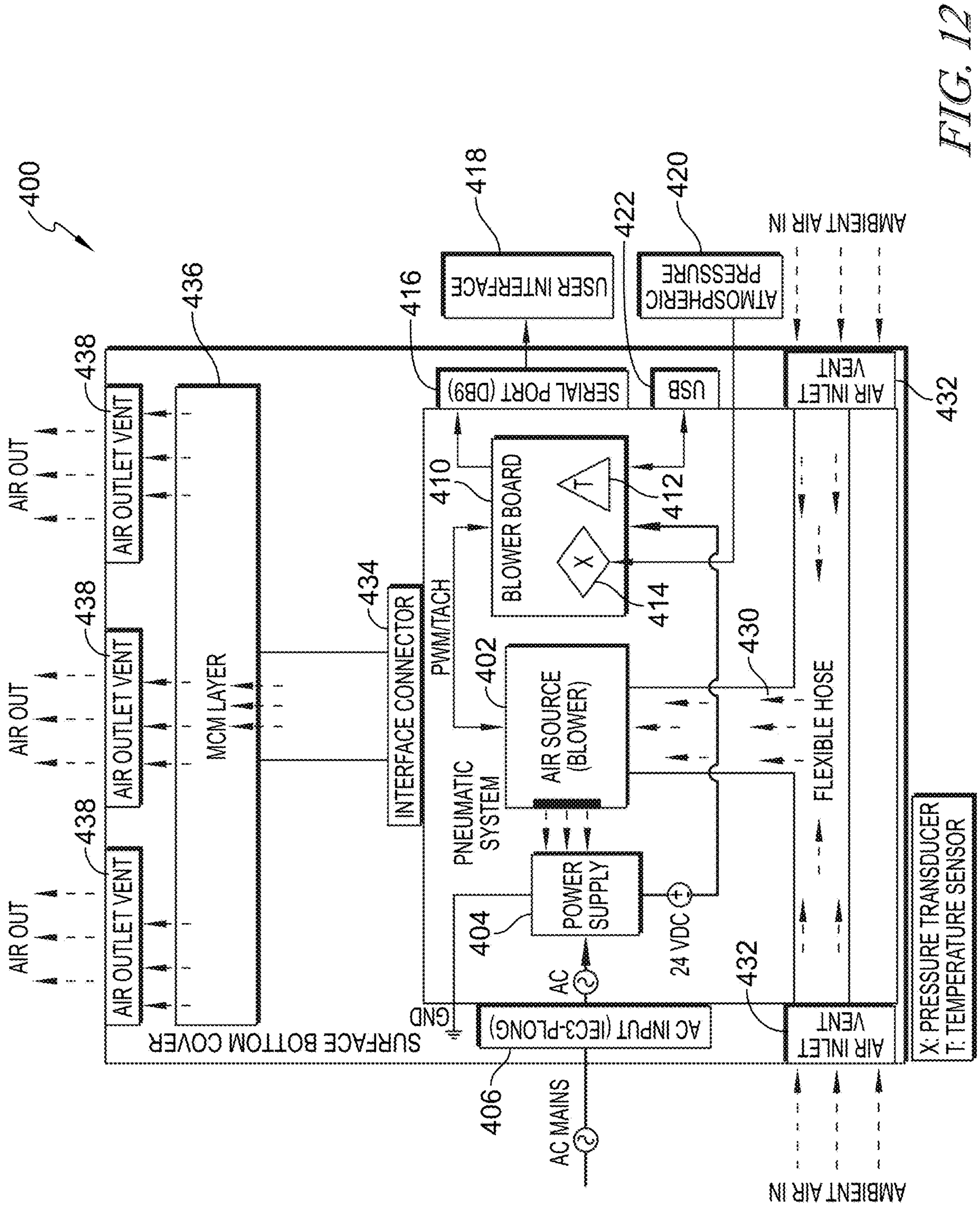
FIG. 12 is a schematic view of pneumatic system of a stretcher in accordance with an embodiment.

Referring now to FIG. 12, a pneumatic system 400 is usable with either of the stretchers 10 or 210. The pneumatic system 400 includes an air source 402, for example a blower, coupled to a power supply 404 having a power input 406. In some embodiments, the air source 402 is positioned in the patient support surface (described above) of the stretcher. In some embodiments, the air source 402 is positioned on one of the frames (described above) of the stretcher. In some embodiments, the air source 402 is separate from the stretcher and couple thereto with a hose or the like. The power supply 404 is an external power supply plugged into the power input 406, in some embodiments. The power supply 406 is a battery of the stretcher, in some embodiments.

A control circuitry 410 is electronically coupled to the air source 402 and configured to operate the air source 402. The control circuitry 410 includes a processor and a memory, wherein the memory stores instructions that are operable by the processor to control the air source 402. The control circuitry 410 includes a temperature sensor 412 and a pressure sensor 414. The pressure sensor 414 compares a pressure in the pneumatic system 400 (for example, in the air source 402) to an atmospheric pressure 420. In some embodiments, the air source 402 is controlled based on feedback from the temperature sensor 412 and the pressure sensor 414. The control circuitry 410 includes a port 416 for coupling to a user interface 418. The port 416 is wired or wireless, in some embodiments. The user interface 418 includes user inputs for controlling the air source 402. The user interface 418 is positioned on the stretcher, in some embodiments. The user interface 418 is separate from the stretcher, in some embodiments, and communicates with the control circuitry 410 via a wired or wireless connection. The control circuitry 410 also includes a port 422, for example, a universal serial bus port, for coupling external devices to the control circuitry 410.

A hose 430 extends from the air source 402 to at least one air inlet 432. The illustrated embodiment includes a pair of air inlets 432. In some embodiments, any number of air inlets 432 are provided. In an embodiment where the air source 402 is positioned in the patient support surface, the hose 430 extends through the patient support surface and the air inlets 432 are positioned at an outer edge or surface of the patient support surface. The air inlets 430 and the hose 430 pull air into the air source 402, when the air source 402 is operational. An interface connector 434 discharges the air from the air source 402 to a microclimate management system 436. The microclimate management system 436 discharges cooling air throughout the patient support surface. The air is discharged through vents 438 in the patient support surface. In some embodiments, the patient support surface includes any number of vents.

Figure 13:
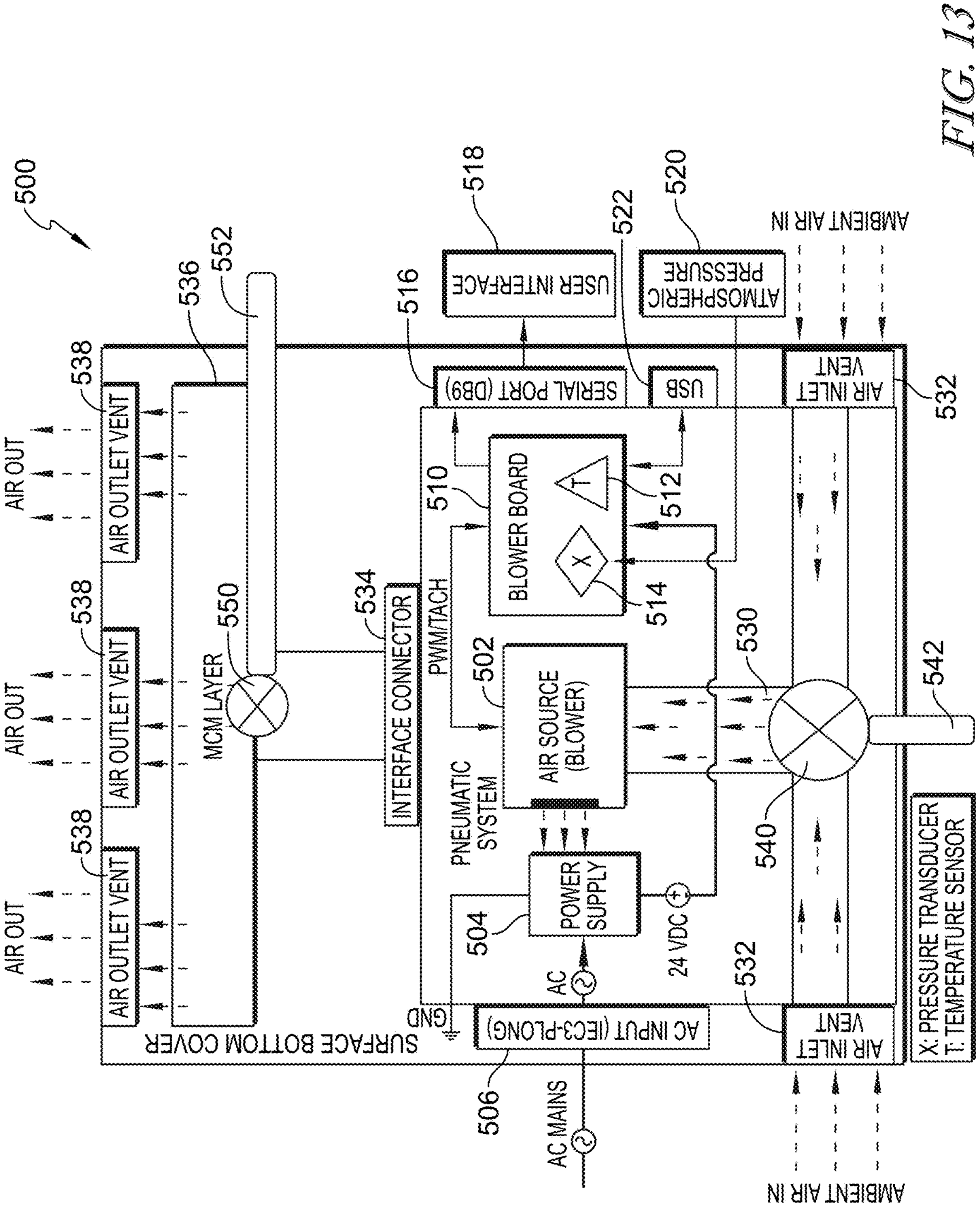
FIG. 13 is a schematic view of pneumatic system of a stretcher in accordance with another embodiment.

Referring now to FIG. 13, a pneumatic system 500 is usable with either of the stretchers 10 or 210. The pneumatic system 500 includes an air source 502, for example a blower, coupled to a power supply 504 having a power input 506. In some embodiments, the air source 502 is positioned in the patient support surface (described above) of the stretcher. In some embodiments, the air source 502 is positioned on one of the frames (described above) of the stretcher. In some embodiments, the air source 502 is separate from the stretcher and couple thereto with a hose or the like. The power supply 504 is an external power supply plugged into the power input 506, in some embodiments. The power supply 506 is a battery of the stretcher, in some embodiments.

A control circuitry 510 is electronically coupled to the air source 502 and configured to operate the air source 502. The control circuitry 510 includes a processor and a memory, wherein the memory stores instructions that are operable by the processor to control the air source 502. The control circuitry 510 includes a temperature sensor 512 and a pressure sensor 514. The pressure sensor 514 compares a pressure in the pneumatic system 500 (for example, in the air source 502) to an atmospheric pressure 520. In some embodiments, the air source 502 is controlled based on feedback from the temperature sensor 512 and the pressure sensor 514. The control circuitry 510 includes a port 516 for coupling to a user interface 518. The port 516 is wired or wireless, in some embodiments. The user interface 518 includes user inputs for controlling the air source 502. The user interface 518 is positioned on the stretcher, in some embodiments. The user interface 518 is separate from the stretcher, in some embodiments, and communicates with the control circuitry 510 via a wired or wireless connection. The control circuitry 510 also includes a port 522, for example, a universal serial bus port, for coupling external devices to the control circuitry 510.

A hose 530 extends from the air source 502 to at least one air inlet 532. The illustrated embodiment includes a pair of air inlets 532. In some embodiments, any number of air inlets 532 are provided. In an embodiment where the air source 502 is positioned in the patient support surface, the hose 530 extends through the patient support surface and the air inlets 532 are positioned at an outer edge or surface of the patient support surface. The air inlets 530 and the hose 530 pull air into the air source 502, when the air source 502 is operational. An interface connector 534 discharges the air from the air source 502 to a microclimate management system 536. The microclimate management system 536 discharges cooling air throughout the patient support surface. The air is discharged through vents 538 in the patient support surface. In some embodiments, the patient support surface includes any number of vents.

A valve 540 is positioned in the hose 530. The valve 540 is coupled to a hose 542. By operating the valve 540 the air in the hose 530 is directed into the hose 542 so that the air can be fed to another system, for example at least one of a microclimate management system, a turn assist bladder, a surgical smoke vacuum, a ventilation and air filtration system, a heating and cooling system, an air assisted transfer system, an x-ray bladder, a patient boosting bladder, and a surface width extension and retraction system.

Additionally, a valve 550 is positioned between the interface connector 534 and the microclimate management system 536. The valve 550 is coupled to a hose 552. By operating the valve 550 the air in the interface connector 534 is directed into the hose 552 so that the air can be fed to another system, for example at least one of a microclimate management system, a turn assist bladder, a surgical smoke vacuum, a ventilation and air filtration system, a heating and cooling system, an air assisted transfer system, an x-ray bladder, a patient boosting bladder, and a surface width extension and retraction system.

Figure 14:
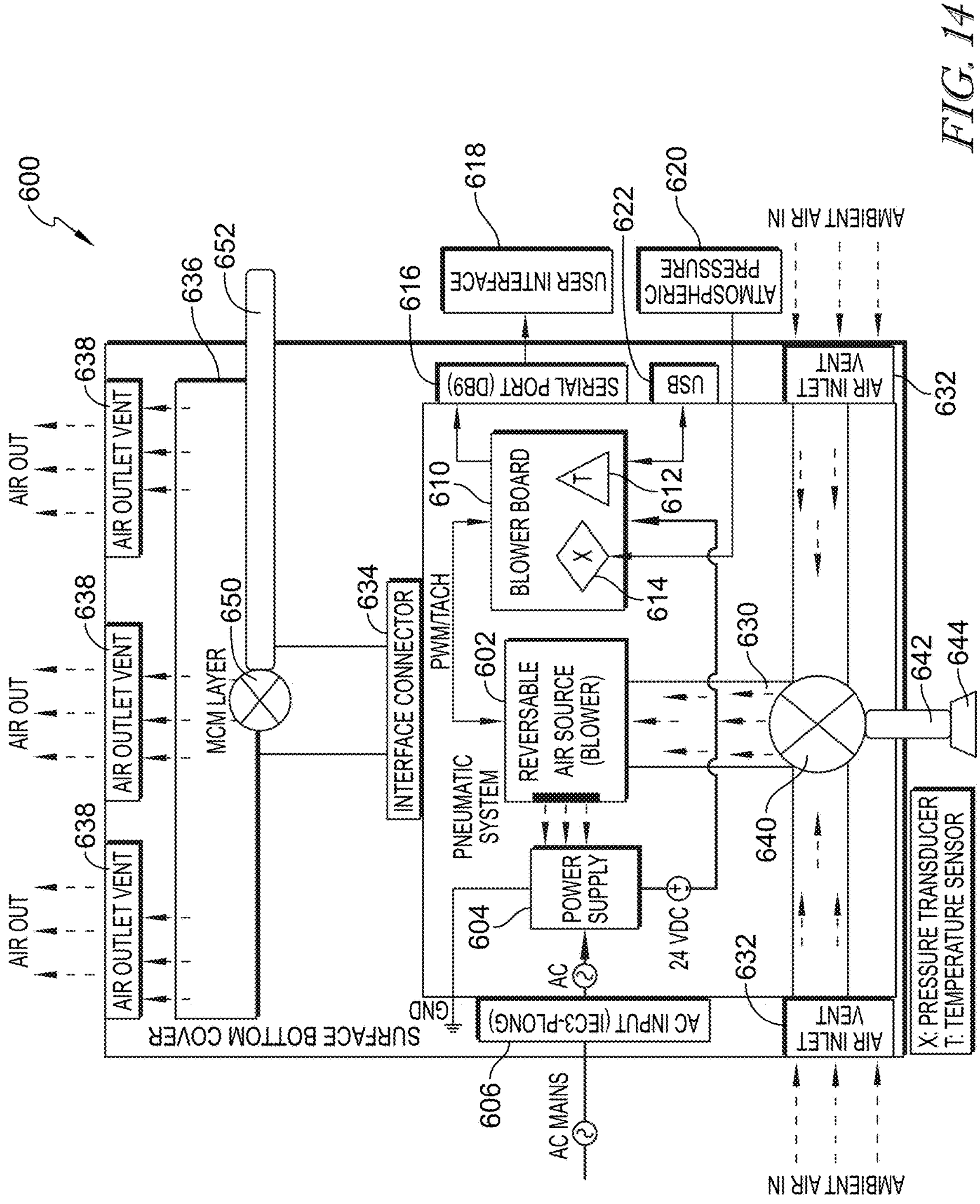
FIG. 14 is a schematic view of pneumatic system of a stretcher in accordance with yet another embodiment.

Referring now to FIG. 14, a pneumatic system 600 is usable with either of the stretchers 10 or 210. The pneumatic system 600 includes a reversible air source 602, operable as a blower or a vacuum, coupled to a power supply 604 having a power input 606. In some embodiments, the air source 602 is positioned in the patient support surface (described above) of the stretcher. In some embodiments, the air source 602 is positioned on one of the frames (described above) of the stretcher. In some embodiments, the air source 602 is separate from the stretcher and couple thereto with a hose or the like. The power supply 604 is an external power supply plugged into the power input 606, in some embodiments. The power supply 606 is a battery of the stretcher, in some embodiments.

A control circuitry 610 is electronically coupled to the air source 602 and configured to operate the air source 602. The control circuitry 610 includes a processor and a memory, wherein the memory stores instructions that are operable by the processor to control the air source 602. The control circuitry 610 includes a temperature sensor 612 and a pressure sensor 614. The pressure sensor 614 compares a pressure in the pneumatic system 600 (for example, in the air source 602) to an atmospheric pressure 620. In some embodiments, the air source 602 is controlled based on feedback from the temperature sensor 612 and the pressure sensor 614. The control circuitry 610 includes a port 616 for coupling to a user interface 618. The port 616 is wired or wireless, in some embodiments. The user interface 618 includes user inputs for controlling the air source 602. The user interface 618 is positioned on the stretcher, in some embodiments. The user interface 618 is separate from the stretcher, in some embodiments, and communicates with the control circuitry 610 via a wired or wireless connection. The control circuitry 610 also includes a port 622, for example, a universal serial bus port, for coupling external devices to the control circuitry 610.

A hose 630 extends from the air source 602 to at least one air inlet 632. The illustrated embodiment includes a pair of air inlets 632. In some embodiments, any number of air inlets 632 are provided. In an embodiment where the air source 602 is positioned in the patient support surface, the hose 630 extends through the patient support surface and the air inlets 632 are positioned at an outer edge or surface of the patient support surface. The air inlets 630 and the hose 630 pull air into the air source 602, when the air source 602 is operational. An interface connector 634 discharges the air from the air source 602 to a microclimate management system 636. The microclimate management system 636 discharges cooling air throughout the patient support surface. The air is discharged through vents 638 in the patient support surface. In some embodiments, the patient support surface includes any number of vents.

A valve 640 is positioned in the hose 630. The valve 640 is coupled to a hose 642. By operating the valve 640 the air in the hose 630 is directed into the hose 642 so that the air can be fed to another system, for example at least one of a microclimate management system, a turn assist bladder, a surgical smoke vacuum, a ventilation and air filtration system, a heating and cooling system, an air assisted transfer system, an x-ray bladder, a patient boosting bladder, and a surface width extension and retraction system. A filter 644 is positionable at the end of the hose 642.

Additionally, a valve 650 is positioned between the interface connector 634 and the microclimate management system 636. The valve 650 is coupled to a hose 652. By operating the valve 650 the air in the interface connector 634 is directed into the hose 652 so that the air can be fed to another system, for example at least one of a microclimate management system, a turn assist bladder, a surgical smoke vacuum, a ventilation and air filtration system, a heating and cooling system, an air assisted transfer system, an x-ray bladder, a patient boosting bladder, and a surface width extension and retraction system. In some embodiments, the reversible air source 602 is set to a vacuum function so that air is drawn into the vents 638 and discharged to the other system through the hoses 642 and 652.

In the embodiments of FIGS. 12-14, the stretcher is used across many environments and for many clinical objectives that include supporting patients for long periods of time, transporting patients, and supporting procedures. Hospital bed powered surfaces are often equipped with blowers that serve a specific purpose (i.e. microclimate management blower or inflating support bladders). However, the blowers of FIGS. 12-14 are able to address multiple needs using the same hardware. In one embodiment, at least one valve directs air or suction from the blower through the support surface to at least one of a surgical smoke vacuum inlet, a ventilation and air filtration system to create an air curtain of upwardly flowing filtered air around at least a portion of a perimeter of the patient support surface, and an x-ray bladder of the patient support surface to open an x-ray cassette pocket to facilitate insertion and removal of an x-ray cassette.

Microclimate management (MCM) includes blowing air through a spacer material to cool and dry the skin. This can be increasingly important for stretchers as patient remain on them for long durations as staffing is more limited in the emergency department. This can be the initiation of pressure injuries that subsequently appear in inpatient units later in the patient's stay. Operating turn assist to help turn patients includes using inflating support bladders to provide optimal immersion and minimize peak pressure.

An additional need that the blowers of FIGS. 12-14 support includes surgical smoke evacuation. Stretchers are currently used for surgical procedures, and more highly featured models are proposed to serve even more applications such as at ambulatory surgical centers. A side effect of these procedures is surgical smoke, which can irritate the respiratory tract and has a high concentration of carcinogens. Despite this harm, surgeons struggle to protect themselves from surgical smoke. Use of the blower to create a vacuum to draw smoke away from the surgical site provides a substantial benefit for modest incremental cost.

Another need that the blowers of FIGS. 12-14 support includes ventilation and air filtration. Stretchers are often used in the emergency department where airborne diseases are common. A blower controls the flow of air around the patient by drawing air away from the patient, potentially running it through a filter or UV cleaner, and then directing both upward to create an air curtain. In some embodiments, the air is also directed toward the floor to extend the air curtain to the floor. This reduces the risk of the occupying patient infecting others. Alternatively, air flows in the opposite direction, moving filtered air toward the patient to reduce the risk of infection to the occupying patient. In some embodiments, the direction of airflow is reversible based on the symptoms of the patient.

Yet another need that the blowers of FIGS. 12-14 support includes heating and cooling, particularly in conjunction with a thermoelectric cooling system. A thermoelectric cooling system is used to cool the skin at body locations where pressure injuries are likely to occur, or warm and cool the patient for comfort. Air movement behind the opposite side of the thermoelectric device improves the efficiency and capability of the device. In some embodiments, this cooling takes the form of a traditional fan.

A further need that the blowers of FIGS. 12-14 support includes air assisted transfer. A strong blower is used to provide functionality similar to an air assisted transfer device. The air is provided via a universal port that connects to any air assisted devices, an umbilical cord that connects to a coverlet, or a chamber on the underside of the mattress that allows the mattress to slide between surfaces. By blowing air through tiny holes, the friction of the transfer or repositioning is substantially reduced.

Yet a further need that the blowers of FIGS. 12-14 support includes inflating X-ray bladders. X-rays are commonly performed in the ED, and inserting X-Ray cartridges behind heavy patients can be physically demanding. Much like turn assist bladders are inflated to help position and turn a patient, a blower also operates bladders that help to increase the opening in the surface through which an X-ray cartridge is inserted.

Another need that the blowers of FIGS. 12-14 support includes boosting the patient. Patients must frequently be boosted in a bed or stretcher, a task which has a high risk of injury and requires multiple staff that are often occupied. The blower inflates bladders below the legs of the patient to reposition the patient up in bed.

At least one need that the blowers of FIGS. 12-14 support includes surface width extension and retraction. In some circumstances, it is desirable to adjust the width of the stretcher. This is particularly needed if a stretcher is to transition between transporting or supporting the patient and use for surgical procedures. In this application the blower is used to provide a vacuum to retract the width or to expand the width of the mattress. The same functionality is also usable to shorten or lengthen the mattress or to expand other zones (e.g., supporting proning, creating a zone at the base of the neck to prevent movement during Trendelenburg positioning).

The embodiments of FIGS. 12-14 involve using a single blower for multiple purposes. In some embodiments a lower-powered blower is used for MCM, surgical smoke evacuation, ventilation and air filtration, and heating and cooling, and a higher-powered blower is used for turn assist, support bladders, air assisted transfers, x-ray bladders, boosting the patient, and surface width extension & retraction. The blower(s) are locatable in either the frame or in the mattress/surface. In some embodiments, surgical smoke evacuation and ventilation/air filtration use vents located in several different locations. Vents are placed on the surface or side of the upper frame, in the side or surface of the mattress, in the siderails, or in flexible conduit connected under the deck. These vents are also be designed to cool the patient. It is possible that multiple features are driven simultaneously or separately.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A stretcher for transporting a patient, the stretcher comprising:
- a frame having a head deck section and a thigh deck section, each of the head deck section and the thigh deck section including:
  - a center section having an upwardly facing surface,
  - at least one side panel positioned adjacent the center section, the at least one side panel having an upwardly facing surface, and
  - at least one surgical accessory rail positioned below the at least one side panel,
  - wherein the at least one side panel is moveable relative to the center section to place the surgical accessory rail in a use position.

2. The stretcher of claim 1, wherein the at least one side panel includes a right side panel and a left side panel.

3. The stretcher of claim 2, wherein the right side panel moves independently of the left side panel.

4. The stretcher of claim 1, wherein the at least one side panel moves relative to the center section such that the upwardly facing surface of the at least one side panel rotates ninety degrees to position the surgical accessory rail in the use position.

5. The stretcher of claim 1, wherein the at least one side panel is slid inward to expose the surgical accessory rail for use.

6. The stretcher of claim 1, wherein the at least one side panel for each of the head deck section and thigh deck section includes a right side panel and a left side panel.

7. The stretcher of claim 6, wherein each right side panel and left side panel for each of the head deck section and the thigh deck section moves independently of the other of the side panels.

8. The stretcher of claim 1, wherein the stretcher includes a patient support surface that includes at least one bolster positioned on at least one of the at least one side panel and a center section, wherein the at least one bolster is moveable relative to the center section when the at least one side panel is moved.

9. The stretcher of claim 8, wherein the at least one bolster includes:

a head bolster and a at least one of the at least one side bolster positioned on the thigh panel.

10. The stretcher of claim 9, wherein the head bolster moves independently from the thigh bolster.

11. The stretcher of claim 8, wherein the patient support surface includes a collapsible section joining the center section to the at least one bolster, wherein the collapsible section is configured to collapse to expose the surgical accessory rail.

12. The stretcher of claim 11, wherein the collapsible section is configured to collapse so that the at least one bolster is moved inward toward the center section.

13. The stretcher of claim 11, wherein the collapsible section includes collapsible foam.

14. The stretcher of claim 11, wherein the collapsible section includes diamond cut foam.

15. The stretcher of claim 1, wherein the at least one side panel is moved to reduce the surface area of the upwardly facing surface.

16. The stretcher of claim 1, further comprising a siderail that is movable relative to the at least one side panel.

17. The stretcher of claim 16, wherein the siderail is collapsible.

18. The stretcher of claim 17, wherein when the siderail is collapsed, the siderail is movable to a position below the at least one side panel.

19. The stretcher of claim 1, further comprising:

a patient support surface having a smoke vacuum inlet, a blower, an air filtration system, a conduit from the smoke vacuum inlet, and at least one valve to direct air or suction from the blower through the patient support surface to at least one of the smoke vacuum inlet and the air filtration system to create an air curtain of upwardly flowing filtered air around at least a portion of a perimeter of the patient support surface, and an x-ray bladder of the patient support surface to open an x-ray cassette pocket to facilitate insertion and removal of an x-ray cassette.

20. The stretcher of claim 19, wherein the blower is positioned in the patient support surface.

21. The stretcher of claim 19, wherein the blower is positioned on the frame.

22. The stretcher of claim 19, wherein the at least one valve directs air or suction to at least one of a microclimate management system, a turn assist bladder, a heating and cooling system, an air assisted transfer system, a patient boosting bladder, and a surface width extension and retraction system.

* * * * *